United States Patent
Kwon et al.

(10) Patent No.: US 12,338,397 B2
(45) Date of Patent: Jun. 24, 2025

(54) MATERIALS FOR SEPARATING MIXTURES VIA SELECTIVE ABSORPTION

(71) Applicant: University of Kansas, Lawrence, KS (US)

(72) Inventors: Gibum Kwon, Lawrence, KS (US); Bishwash Shrestha, Lawrence, KS (US); Mohammadamin Ezazi, Lawrence, KS (US)

(73) Assignee: University of Kansas, Lawrence, KS (US)

( * ) Notice: Subject to any disclaimer, the term of this patent is extended or adjusted under 35 U.S.C. 154(b) by 531 days.

(21) Appl. No.: 17/722,825

(22) Filed: Apr. 18, 2022

(65) Prior Publication Data

US 2022/0331749 A1   Oct. 20, 2022

Related U.S. Application Data

(60) Provisional application No. 63/176,473, filed on Apr. 19, 2021.

(51) Int. Cl.
    *C10G 25/00*    (2006.01)
    *B01D 71/40*    (2006.01)
    *H01M 8/0221*   (2016.01)

(52) U.S. Cl.
    CPC ......... *C10G 25/003* (2013.01); *B01D 71/401* (2022.08); *H01M 8/0221* (2013.01); *B01D 2325/18* (2013.01)

(58) Field of Classification Search
    CPC ............... C10G 25/003; B01D 71/401; B01D 2325/18; B01D 67/0006; B01D 2323/30;
    (Continued)

(56) References Cited

U.S. PATENT DOCUMENTS 9,186,631 B2   11/2015   Tuteja et al.
9,350,039 B2    5/2016   Perry
(Continued)

FOREIGN PATENT DOCUMENTS

WO   WO 2005/102503 A1   11/2005

OTHER PUBLICATIONS

Zhu et al., Zwitterionic Nanohydrogel Grafted PVDF Membranes with Comprehensive Antifouling Property and Superior Cycle Stability for Oil-in-Water Emulsion Separation, 2018, Adv. Funct. Mater., 28, 1804121 (Year: 2018).*
(Continued)

*Primary Examiner* — Daniel S Gatewood
(74) *Attorney, Agent, or Firm* — Bell & Manning, LLC

(57) ABSTRACT

A method of separating a mixture of fluids may comprise contacting an absorbent material with a mixture of fluids comprising a first fluid and a second fluid having different polarities, wherein the absorbent material selectively absorbs the first fluid to provide a permeate comprising the first fluid and a retentate comprising the second fluid. The absorbent material comprises a zwitterionic polymer, the zwitterionic polymer being a polymerization product of reactants comprising a zwitterionic monomer and a (meth) acrylate crosslinker. The zwitterionic monomer is selected from the group consisting of: a zwitterionic monomer of Formula I, R—$(CH_2)_m$—$NR'_2{}^+$—$(CH_2)_n$-$A^-$, wherein R is selected from a carboxyamide, a (meth)acrylate, and an alkyl; m is an integer of from 0 to 5; each R' is independently selected from hydrogen and an alkyl; n is an integer of from 1 to 5; and $A^-$ is $SO_3{}^-$ or $CO_2{}^-$; a zwitterionic monomer of Formula II, R—$(CH_2)_m$-$A^-$-$(CH_2)_n$—$NR'_3{}^+$, wherein R is an (meth)acrylate; m is an integer of from 1 to 5; A is $PO_4{}^-$; n is an integer of from 1 to 5; and each R' is independently selected from hydrogen and an alkyl; carboxybetaine dia-
(Continued)

crylamide; (3-methacryloylamino-propyl)-(2-carboxy-ethyl)-dimethylammonium; 3-[Dimethyl-(2-hydroxyethyl)ammonio]-1-propanesulfonate; 1-methylpyridinium 3-sulfonate; and combinations thereof.

22 Claims, 21 Drawing Sheets

(58) Field of Classification Search
 CPC .. B01D 71/10; B01D 2325/12; H01M 8/0221
 See application file for complete search history.

(56) References Cited

U.S. PATENT DOCUMENTS

| 10,333,164 | B2 | 6/2019 | Sullivan | |
|---|---|---|---|---|
| 2016/0038885 | A1* | 2/2016 | Hogen-Esch | B01D 71/76 210/500.33 |

OTHER PUBLICATIONS

Zhang et al., Synthesis and characterization of novel cardo poly(aryl ethersulfone) bearing zwitterionic side groups for proton exchange membranes, 2011, Intl. J of Hydrogen Energy, 36, 5512-5520 (Year: 2011).*

Sun et al., High strength zwitterionic nano-micelle hydrogels with superior self-healing, adhesive and ion conductive properties, 2020, European Polymer Journal, 133, 109761 (Year: 2020).*

Qiang Zhang et al., "Synthesis and characterization of novel cardo (poly(aryl ether sulfone) bearing zwitterionic side groups for proton exchange membranes," *International Journal of Hydrogen Energy* 36 (2011) 5512-5520.

Anjana Maharjan, "Hydrogel with Selective Absorption for Separation of Liquid Mixtures," Thesis Submitted to the Department of Mechanical Engineering and the Graduate Faculty of the University of Kansas, Aug. 28, 2018; pp. 1-116.

Boguslaw Buszewski et al., "Hydrophilic interaction liquid chromatography (HILIC)—a powerful separation technique," Anal Bioanal Chem (2012), 402: pp. 231-247.

Jing Zhao et al., "Incorporating Zwitterionic Graphene Oxides into Sodium Alginate Membrane for Efficient Water/Alcohol Separation," ACS Appl. Mater. Interfaces 2016, vol. 8; pp. 2097-2103.

Yuzhang Zhu et al., "Zwitterionic Nanohydrogel Grafted PVDF Membranes with Comprehensive Antifouling Property and Superior Cycle Stability for Oil-in-Water Emulsion Separation," ADV. Funct. Mater. 2018, vol. 28; 1804121 (1 of 10).

* cited by examiner

MATERIALS FOR SEPARATING MIXTURES VIA SELECTIVE ABSORPTION

CROSS-REFERENCE TO RELATED APPLICATIONS

The present application claims priority to U.S. provisional patent application number 63/176,473 that was filed Apr. 19, 2021, the entire contents of which are incorporated herein by reference.

BACKGROUND

Separation of miscible and/or immiscible liquids has a key role in the process in a wide range of different industries including petrochemicals, textiles, leather to the waste water treatment plant and biofuel production.

While separating immiscible oil and water is relatively well-established, separating miscible liquids requires careful considerations of operating conditions including temperature, pressure, solubility, etc. For example, in the petroleum refining process, separating small quantities of miscible impurities including sulfur, nitrogen and metallic compounds often requires energy-intensive and complicated fractional distillation followed by post-treatment. Further, biofuels (e.g., bioethanol or biodiesel) can only be produced by removing the dissolved byproducts.

Various methodologies including distillation, liquid-liquid extraction and membranes have been used to separate miscible liquids. Distillation separates components from a mixture based on the differences in their boiling points. Since distillation is a simple and well-established technology, it is by far the most widely used separation process. However, it has low energy efficiency and requires thermal stability of compounds at their boiling points. In addition, it is not suitable for the separation of components with similar boiling points such as azeotropes.

Liquid-liquid extraction (LLE) is typically used to separate azeotropes and components with overlapping boiling points in which a simple distillation cannot be used. LLE is a technique that separates components dissolved in a mixture by contact with another insoluble liquid (extractant). Components are separated based on their difference in solubility. One of the primary challenges in LLE is to increase the contact between the feed liquid mixture and the extractant for efficient mass transfer. This can be typically achieved by energy-intensive ultrasonication or emulsification which requires the non-trivial post-separation processes, causing the overall technology expensive and complicated.

Membrane-based technologies physically separate a liquid mixture into its components by allowing one phase to permeate through the membrane while retaining the other component. Since the separation may be performed at ambient temperature without chemically altering the components, membrane-based separation operations consume less energy than other separation methods. However, membranes alone cannot separate miscible components unless coupled with other separation techniques including extraction or evaporation. In addition, membrane fouling is a critical issue during the separation operation, which results in a decline of the permeability and a poor separation efficiency.

SUMMARY

Provided herein are absorbent materials and devices incorporating the absorbent materials. The absorbent materials comprise certain zwitterionic polymers. The absorbent materials may be used to separate a mixture of fluids having different polarities, including a mixture of miscible fluids, even azeotropes. By contrast to existing technologies, such separations may be achieved under ambient conditions (room temperature/atmospheric pressure) without an input of energy such as heat and/or pressure. The absorbent materials may also be used to selectively retain a particular fluid within the absorbent material or selectively block a particular fluid from passing through the absorbent material, rendering them useful in other applications, including fuel cells.

Methods of separating a mixture of fluids are provided. In an embodiment, such a method comprises contacting an absorbent material with a mixture of fluids comprising a first fluid and a second fluid having different polarities, wherein the absorbent material selectively absorbs the first fluid to provide a permeate comprising the first fluid and a retentate comprising the second fluid. The absorbent material comprises a zwitterionic polymer, the zwitterionic polymer being a polymerization product of reactants comprising a zwitterionic monomer and a (meth)acrylate crosslinker. The zwitterionic monomer is selected from the group consisting of: a zwitterionic monomer of Formula I, $R-(CH_2)_m-NR'_2{}^+-(CH_2)_n-A^-$, wherein R is selected from a carboxyamide, a (meth)acrylate, and an alkyl; m is an integer of from 0 to 5; each R' is independently selected from hydrogen and an alkyl; n is an integer of from 1 to 5; and $A^-$ is $SO_3^-$ or $CO_2^-$; a zwitterionic monomer of Formula II, $R-(CH_2)_m-A^--(CH_2)_n-NR'_3{}^+$, wherein R is an (meth)acrylate; m is an integer of from 1 to 5; A is $PO_4^-$; n is an integer of from 1 to 5; and each R' is independently selected from hydrogen and an alkyl; carboxybetaine diacrylamide; (3-methacryloylamino-propyl)-(2-carboxy-ethyl)-dimethylammonium; 3-[Dimethyl-(2-hydroxyethyl)ammonio]-1-propane-sulfonate; 1-methylpyridinium 3-sulfonate; and combinations thereof.

Absorbent materials and devices incorporating the absorbent materials are also provided. Other principal features and advantages of the disclosure will become apparent to those skilled in the art upon review of the following drawings, the detailed description, and the appended claims.

BRIEF DESCRIPTION OF THE DRAWINGS

Illustrative embodiments of the disclosure will hereafter be described with reference to the accompanying drawings.

DETAILED DESCRIPTION

Figure 1:
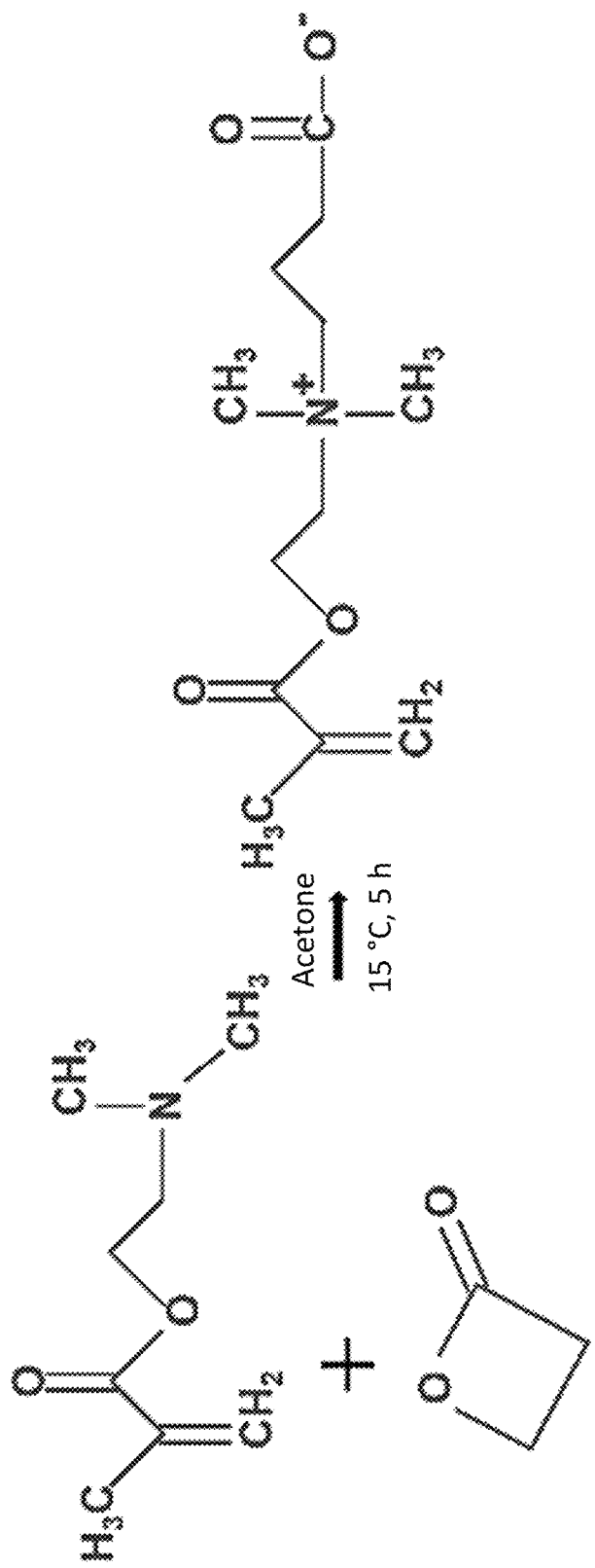
FIG. 1 depicts a schematic illustration of the synthesis of carboxybetaine methacrylate (CBMA) zwitterionic monomer.

The present disclosure provides absorbent materials and devices incorporating the absorbent materials. Methods of making and using the absorbent materials are also provided.

In embodiments, an absorbent material comprises a zwitterionic polymer, the zwitterionic polymer being a polymerization product of reactants comprising a zwitterionic monomer and generally, a crosslinker. This polymerization product refers to the material resulting from polymerization reactions between reactants, e.g., between zwitterionic monomers and if a crosslinker is present, between zwitterionic monomers and crosslinkers. These polymerization reactions generally also involve an initiator and may involve an accelerator, one or both of which may also become incorporated into the zwitterionic polymer. The polymerization reactions may be free-radical polymerization reactions and the polymerization product may be a free-radical polymerization product. In embodiments, the material resulting from the polymerization reaction is a crosslinked homopolymer.

The particular combination of molecular components (e.g., zwitterionic monomer, crosslinker, etc.) as well as the relative amounts of the molecular components are selected to render the zwitterionic polymer (and the absorbent material made therefrom) with certain properties. These properties include the ability to selectively absorb a fluid from a mixture of fluids in contact with the absorbent material and under the conditions at which the absorbent material is being used. These conditions may be "ambient conditions," i.e., room temperature (e.g., about 23° C.) and atmospheric pressure (about 1 atm). The mixture of fluids comprises at least two fluids (e.g., a first fluid and a second fluid) having different polarities. The phrase "selective absorption" and the like is used since the absorption of the absorbed fluid (e.g., first fluid) is greater than the absorption (if any) of the second fluid in the mixture by the zwitterionic polymer/absorbent material under the same conditions. The absorption of the second fluid by the zwitterionic polymer/absorbent material may be zero or sufficiently small that the zwitterionic polymer/absorbent material may be characterized as "repelling" or "blocking" the second fluid under the same conditions. In embodiments, the absorption capacity of the zwitterionic polymer/absorbent material to the first fluid is 2 mL/g±0.2 mL/g while the absorption capacity of the zwitterionic polymer/absorbent material to the second fluid is 0±0.001 mL/g. These values establish the selectivity of the absorption.

Regarding the molecular components from which the zwitterionic polymer is formed, these include zwitterionic monomers. In embodiments, the zwitterionic monomer has Formula I, R—$(CH_2)_m$—$NR'_2{}^+$—$(CH_2)_n$-$A^-$, In Formula I, R may be selected from a carboxyamide, a (meth)acrylate, and an alkyl; m may be an integer of from 0 to 5; each R' may be independently selected from hydrogen and an alkyl; n may be an integer of from 1 to 5; and A is an anion, e.g., $PO_4{}^-$, $SO_3{}^-$ or $CO_2{}^-$. The term "carboxyamide" refers to R"—C(O)—NR", wherein each R" may be independently selected from hydrogen and an alkyl. Due to the definition of R" being H or an alkyl, a $CH_2C(CH_3)CONH$— group is not a carboxyamide group. The term "(meth)acrylate" may refer to either $CH_2CHCOO$ or $CH_2CCH_3COO$. The term "alkyl" may refer to a linear alkane having from 1 to 20 carbon atoms, e.g., 1, 2, 3, 4, 5, 6, 7, 8, 9, 10, 11, 12, 13, 14, 15, 16, 17, 18, 19, 20.

In embodiments, the zwitterionic monomer has Formula IA, R—$(CH_2)_m$—$NR'_2{}^+$—$(CH_2)_n$-$A^-$, wherein R is selected from a carboxyamide and a (meth)acrylate; m is an integer of from 1 to 5; each R' is independently selected from hydrogen and an alkyl; n is an integer of from 1 to 5; and A is $SO_3{}^-$. Carboxyamide, (meth)acrylate, and alkyl have been defined above. In some embodiments, each R' is independently selected from hydrogen and methyl and the carboxyamide has formula R"—C(O)NH, wherein R" is an alkyl having from 5 to 20 carbons.

In embodiments, the zwitterionic monomer has Formula IB, R—$NR'_2{}^+$—$(CH_2)_n$-$A^-$, wherein R is an alkyl; each R" is independently selected from hydrogen and an alkyl; n is an integer of from 1 to 5; and A is $SO_3{}^-$ or $CO_2{}^-$. Alkyl has been defined above. In some embodiments, each R' is independently selected from hydrogen and methyl and R is an alkyl having from 5 to 20 carbons.

In embodiments, the zwitterionic monomer has Formula II, R—$(CH_2)_m$-$A^-$-$(CH_2)_n$-$NR'_3{}^+$. In Formula II, R may be (meth)acrylate; m may be an integer of from 1 to 5; A is an anion, e.g., $PO_4{}^-$; n may be an integer of from 1 to 5; and each R' may be independently selected from hydrogen and an alkyl. (Meth)acrylate and alkyl have been defined above. In embodiments, each R' is independently selected from hydrogen and methyl.

Illustrative embodiments of zwitterionic monomers according to these formulas are shown in Table A, below. Each may be used with any of the crosslinkers also listed in Table A.

Although combinations of different types of zwitterionic monomers may be used, in embodiments, a single type of zwitterionic monomer is used to form the zwitterionic polymer.

TABLE A

Illustrative Zwitterionic Monomers and Crosslinkers.

| Zwitterionic Monomers | Crosslinkers |
| --- | --- |
| Carboxybetaine methacrylate | Poly(ethylene glycol) methacrylate |
| [2-(Methacryloyloxy)ethyl]dimethyl-(3-sulfopropyl)ammonium hydroxide | Poly(propylene glycol) methacrylate |
| 2-Methacryloyloxyethyl phosphorylcholine | Poly(ethylene glycol) diacrylate |
| 3-(Decyldimethylammonio)-propane-sulfonate | Poly(ethylene glycol) dimethacrylate |
| 3-[N,N-Dimethyl(3-myristoylaminopropyl)ammonio]propanesulfonate | Poly(propylene glycol) diacrylate |
| N-Dodecyl-N,N-(dimethylammonio)butyrate | 3-(Acryloyloxy)-2-hydroxypropyl methacrylate |
| 3-(N,N-Dimethylmyristylammonio)propanesulfonate | Di(ethylene glycol) diacrylate |
| N-Dodecyl-N,N-dimethyl-3-ammonio-1-propanesulfonate | Hydroxyethyl methacrylate |
| 3-(N,N-Dimethylpalmitylammonio)propanesulfonate | Poly(methyl methacrylate) |
| Carboxybetaine diacrylamide | |
| 3-methacryloylamino-propyl)-(2-carboxy-ethyl)-dimethylammonium | |
| 3-[Dimethyl-(2-hydroxyethyl)ammonio]-1-propanesulfonate | |
| 1-Methylpyridinium 3-sulfonate | |

As noted above, a crosslinker may be used in forming the zwitterionic polymer. Various (meth)acrylate crosslinkers may be used. Illustrative crosslinkers are shown in Table A, above. Each may be used with any of the zwitterionic monomers also listed in Table A. Although combinations of different types of crosslinkers may be used, in embodiments, a single type of crosslinker is used to form the zwitterionic polymer.

An initiator is generally used in forming the zwitterionic polymer, e.g., to induce the polymerization reactions described above. Illustrative initiators include potassium persulfate and polydopamine. An accelerator may also be used, e.g., to catalyze the polymerization reactions. Illustrative accelerators include N,N,N',N'-tetramethyl ethylenediamine.

The zwitterionic polymer is generally formed by combining and mixing the desired components at the desired amounts to form a reaction mixture and exposing the reaction mixture to conditions to induce the polymerization reactions. These conditions may be ambient conditions and sufficient time for the polymerization. Illustrative times are described in the Example, below. The relative amounts of components used may be adjusted to impart the zwitterionic polymer with desired properties, including those described herein. In embodiments, a crosslinker is used and is present in the reaction mixture at an amount of from 0.1% to 20% by weight (as compared to the weight of the zwitterionic monomer). This includes from 0.1% to 15% by weight and from 1% to 10% by weight. In embodiments, an initiator is used and is present in the reaction mixture at an amount of from 0.1% to 10% by weight (as compared to the weight of the zwitterionic monomer). This includes from 0.1% to 5% by weight and from 1% to 5% by weight. In embodiments, an accelerator is used and is present in the reaction mixture at an amount of from 0.1% to 1.0% by weight (as compared to the weight of the zwitterionic monomer). This includes from 0.1% to 0.8% by weight and from 0.1% to 0.5% by weight.

Figure 2:
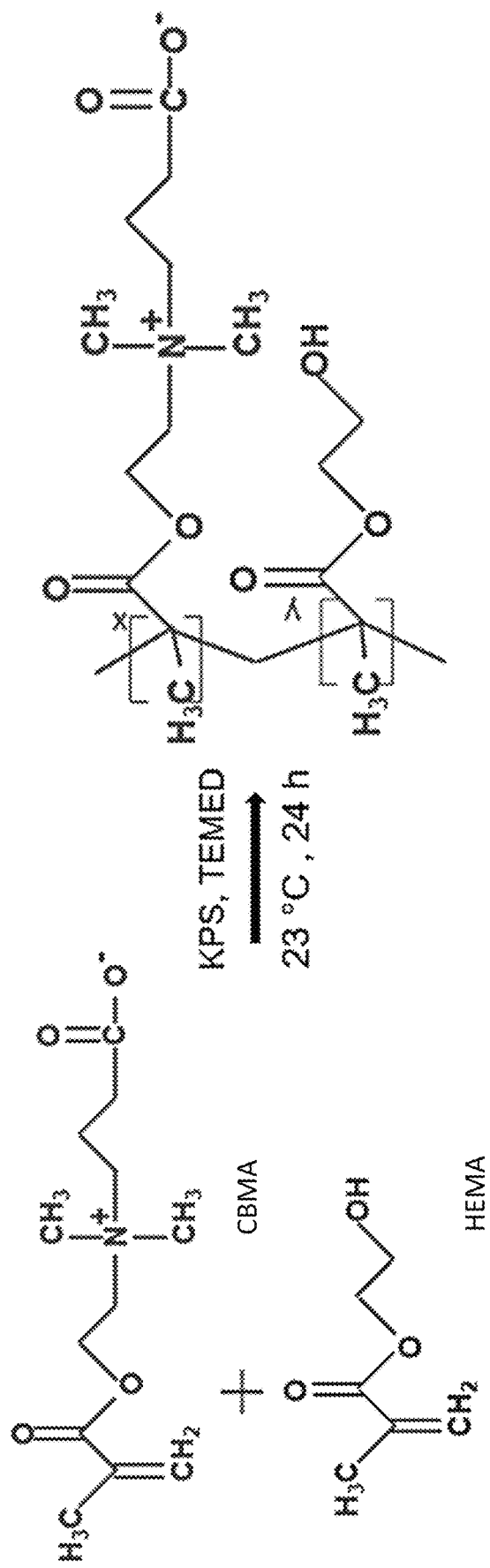
FIG. 2 depicts a schematic illustration of the synthesis of CBMA-HEMA zwitterionic polymer.
Figure 3:
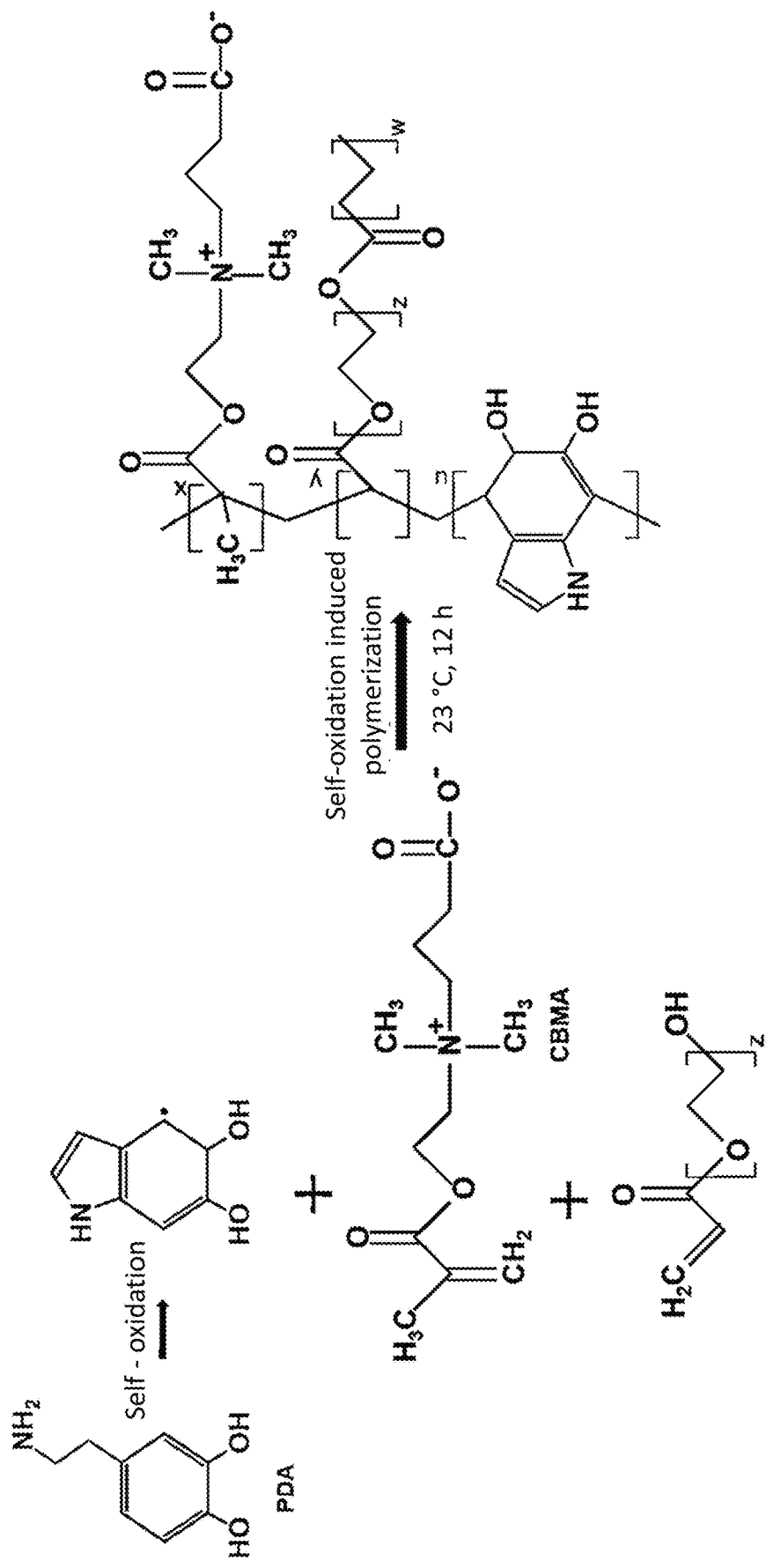
FIG. 3 depicts a schematic illustration of the synthesis of CBMA-PEGMA-PDA zwitterionic polymer.

Illustrative zwitterionic polymers are shown in FIGS. 2 and 3. In FIG. 2, x and y are 50 and 5, respectively. In FIG. 3, x, y, and u are 60, 5, and 10, respectively. Different values of x, y, u may be used.

In embodiments, the zwitterionic polymer is a polymerization product of reactants consisting of a zwitterionic monomer, a crosslinker, and optionally, an initiator. The phrase "consisting of" does not preclude the use of other components, such as an accelerator, to induce/facilitate the polymerization reactions. Rather, the phrase is used in reference to the molecular components which become incorporated into the polymeric chain. The zwitterionic monomer, crosslinker, and initiator may be selected from those described herein. In embodiments one or more types of the zwitterionic monomer, crosslinker, and/or initiator is used. In embodiments, a single type of the zwitterionic monomer, crosslinker, and/or initiator is used.

In embodiments, the following zwitterionic monomers are excluded from use: 4-imidazoleacrylic acid, 4-aminocinnamic acid hydrochloride, 4-(dimethylamino) cinnamic acid, 1-(3-sulfopropyl) -2-vinylpyridinium hydroxide inner salt, 3-sulfopropyldimethyl-3-methacrylamidopropylammonium inner salt, 5-amino-1,3-cyclohexadiene-l-carboxylic acid hydrochloride, and 2-(Methacryloyloxy)ethylldimethyl-(3-sulfopropyl)ammonium hydroxide. In such embodiments, the zwitterionic polymer is free of, i.e., does not comprise, a molecular component derived from these zwitterionic monomers. Similarly, in embodiments, the absorbent material may be considered to be free of, i.e., not comprise a polymerization product formed from these zwitterionic monomers.

In embodiments, the following crosslinkers are excluded from use: 3-(acryloyloxy) -2-hydroxypropyl methacrylate, allyl diglycol carbonate, bis (2-methacryloxyethyl) phosphate, 2,2-bis (4-methacryloxyphenyl) propane, 2,2-bis [4-(2-acryloxyethoxy) phenyl] propane, 2,2-bis [4-(2-hydroxy-3-methacryloxypropoxy) phenyl] propane, 1,4-butanediol diacrylate, 1,3-butanediol dimethacrylate, 1,4-butanediol dimethacrylate, cinnamyl methacrylate, 2-cinnamoyloxyethyl acrylate, trans-1,4-cyclohexanediol dimethacrylate, 1,10- decanediol dimethacrylate, N,N' -diallylacrylamide, diallyl carbonate, diallyl maleate, diallyl phthalate, diallyl pyrocarbonate, diallyl succinate, 1, 3-diallylurea, 1,4-diacryloylpiperazine, diethylene glycol diacrylate, diethylene glycol dimethacrylate, diethylene glycol divinyl ether, 2 , 2-dimethylpropanediol dimethacrylate, dipropylene glycol dimethacrylate, divinyl glycol, divinyl sebacate, divinylbenzene, N,N'-ethylene bisacrylamide, ethylene glycol diacrylate, ethylene glycol dimethacrylate, 1,6-hexanediol diacrylate, 1,6-hexanediol dimethacrylate, N,N'-hexamethylenebisacrylamide, N,N'-methylenebismethacrylamide, 1,9-nonanediol dimethacrylate, pentaerythritol tetraacrylate, pentaerythritol triacrylate, pentaerythritol triallyl ether, 1,5-pentanediol dimethacrylate, 1,4-phenylene diacrylate, tetraethylene glycol dimethacrylate, triallyl cyanurate, triethylene glycol diacrylate, triethylene glycol dimethacrylate, triethylene glycol divinyl ether, 1,1,1-trimethylolpropane diallyl ether, 1,1,1-trimethylolpropane triacrylate, and 1,1,1-trimethylolpropane trimethacrylate. In such embodiments, the zwitterionic polymer is free of, i.e., does not comprise, a molecular component derived from these crosslinkers. Similarly, in embodiments, the absorbent material may be considered to be free of, i.e., not comprise a polymerization product formed from these crosslinkers.

The zwitterionic polymer may be characterized by other properties including molecular weight and degree of crosslinking. In embodiments, the molecular weight of the zwitterionic polymer is in a range of from 1 kDa to 50 kDa. This includes from 5 kDa to 25 kDa and from 10 kDa to 20 kDa. The degree of crosslinking may range from 0.05 to 0.1. This includes from 0.06 to 0.08. The molecular weight of the polymer can be measured by using gel permeation chromatography (GPC).

The ratio of cationic to anionic charges in the zwitterionic polymers is generally 1 such that overall, the zwitterionic polymer is neutral.

Depending upon the desired use, the zwitterionic polymer may assume a variety of forms. In embodiments, the zwitterionic polymer is a free-standing structure and may be used alone as the absorbent material in various applications, e.g., separating fluid mixtures. The overall morphology of the free-standing structure is not particularly limited, e.g., blocks, layers, films, pellets, beads, etc. may be used. Embodiments in which the zwitterionic polymer is a free-standing structure exclude the presence of a substrate, e.g., a porous substrate, in the absorbent material. In embodiments, the zwitterionic polymer is a monolithic structure, by which it is meant that the zwitterionic polymer is a single, unitary structure as opposed to a collection of discrete, individual units (e.g., particles, nanoparticles). Some free-standing structures are also monolithic structures, e.g., blocks, layers, films.

In embodiments, the absorbent material comprises the zwitterionic polymer and a substrate, including a porous substrate. The zwitterionic polymer may be used as a coating on surfaces of such substrates or to fill pores within such substrates. In at least some embodiments in which a substrate is used, however, the zwitterionic polymer is not covalently bound to the substrate. Coating compositions comprising the zwitterionic polymers may be used to coat substrate surfaces. (Alternatively, the coating composition may comprise the reactants (e.g., zwitterionic monomers, etc.) that ultimately form the zwitterionic polymer.) A variety of materials may be used for the substrate, e.g., filter paper, metal foams/meshes/screens, polymer electrolyte membranes (e.g., Nafion membranes), polyethersulfone, etc.

Although the absorbent material may include other additives, in embodiments, no other additives are used. In embodiments, the absorbent material is free of a graphene-based material, e.g., graphene oxide. In embodiments, the absorbent material is free of a low surface energy material, e.g., a halogenated compound, a silsequioxane, or both.

In embodiments, the absorbent material consists of any of the disclosed zwitterionic polymers. In embodiments, the absorbent material consists of any of the disclosed zwitterionic polymers and any of the disclosed substrates. In any of these embodiments, this does not preclude the presence of some amount of salts, solvents, impurities which may be present in the absorbent material.

The present absorbent materials encompass embodiments in which the zwitterionic polymer is not covalently bound to any other component, e.g., a substrate such as poly(vinylidene fluoride) or an additive such as graphene oxide. The present absorbent materials encompass embodiments in which the zwitterionic polymer is not incorporated within a multilayer structure such as is true of absorbent materials composed of alternating layers of polyelectrolyte polymers.

As noted above, the absorbent materials may be used in a variety of applications. In a basic embodiment, a method comprises contacting any of the disclosed absorbent materials with a mixture of fluids comprising at least two fluids (e.g., a first fluid and a second fluid) having different polarities. The absorbent material selectively absorbs one of the fluids (e.g., a first fluid) to provide a permeate comprising the first fluid and a retentate comprising the other fluid (e.g., a second fluid). The permeate refers to the material being absorbed by the absorbent material and which may exit the material on a downstream surface of the absorbent material; the retentate refers to the material retained on the upstream surface of the absorbent material. By way of example, in FIG. 10, the mixture of fluids is ethanol and water; the permeate is water (with a reduced amount or no ethanol) and the retentate is ethanol (with a reduced amount or no water). Due to the selective absorption, the permeate has an increased amount of the first fluid relative to the second fluid (if any) as compared to the original mixture. The retentate has a reduced amount of the first fluid (if any) relative to the second fluid to as compared to the original mixture. Otherwise, the compositions of the permeate and the retentate generally depend upon the characteristics of the zwitterionic polymer/absorbent material (described above), the fluid mixture (described below), and the contact conditions (further described below). However, in embodiments, the permeate comprises at least 95%, at least 96%, at least 97%, at least 98%, at least 99%, or at least 100% of the first fluid. Permeates comprising at least 100% of the first fluid may be considered to consist of the first fluid.

Depending upon how the absorbent material is to be used, in embodiments, the absorbed fluid (e.g., first fluid) is retained within the absorbent material, at least for a period of time. In embodiments, the absorbed fluid passes through the absorbent material, i.e., enters via one outer surface defined by the absorbent material and exits via the outer surface or another outer surface defined by the absorbent material. In the latter embodiments, the absorbed fluid may then be collected.

As noted above, the mixture of fluids contacting the absorbent material comprises at least a first and second fluid. The polarity of the first and second fluids differ from one another. The polarity may be a relative polarity value as measured relative to water having a polarity of about 1. Otherwise, the fluids may be selected from water, alcohols, acids, aromatics, aliphatics, etc. Illustrative alcohols include methanol, ethanol, isopropanol, glycerol, etc. Illustrative acids include acetic acid, etc. Illustrative aromatics include benzene, toluene, etc. Illustrative aliphatics include alkanes such as hexane, heptane, hexadecane, etc.

In embodiments, one of the fluids in the mixture of fluids is water, while the other may be selected from the other components described above. In embodiments, one of the fluids is water, while the other is an alcohol. In embodiments, one of the fluids is an alcohol, while the other is a different alcohol. In embodiments, one of the fluids is an acid, while the other is an alcohol. In embodiments, one of the fluids is an aromatic while the other is an aliphatic. In each of these embodiments, the alcohol, acid, aromatic, and aliphatic may be selected from those described above. Thus, the mixture of fluids that may be used encompasses miscible and immiscible mixtures. In embodiments, the mixture is an azeotropic mixture (i.e., having about a constant boiling point and having about the same composition in its vapor and liquid forms).

In embodiments, the fluid in the mixture of fluids that is selectively absorbed is the more polar fluid (greater polarity) as compared to the second fluid in the mixture. In embodiments, the fluid in the mixture of fluids that is selectively absorbed is water.

The fluid mixture contacting the absorbent material may be in its liquid phase. This includes being a liquid at ambient conditions. The permeate and retentate that result from the contact may also be liquids. Separations resulting from such contact may be characterized as liquid-liquid separations. This is distinguished from pervaporation separation techniques which are generally vapor (permeate)—liquid (mixture/retentate) separations. In embodiments, the fluid mixture contacting the absorbent material is in its vapor phase. The permeate and the retentate that result from the contact may also be vapors. Separations resulting from such contact may be characterized as vapor-vapor separations.

The conditions under which the contacting occurs may refer to the temperature and pressure. As noted above, the temperature and pressure may be room temperature and atmospheric pressure (i.e., ambient conditions). This includes the absence of any pressure difference across the absorbent material. This is different from conditions used in pervaporation separation techniques which generally require an input of energy in the form of temperatures greater than room temperature and/or pressure differences. In other embodiments, the temperature and/or pressure may be other than room temperature and/or atmospheric pressure, but they are still selected so that the fluid mixture is in its liquid phase. In other embodiments, the temperature and/or pressure are selected so that the fluid mixture is in its vapor phase, which may include the permeate being in its vapor phase. However, even in such embodiments, there need not be a pressure difference across the absorbent material (e.g., the pressure used may be different from atmospheric pressure but no pressure difference across the absorbent material is used). Other conditions which may be specified and selected for the contacting include parameters such as the volume of the fluid mixture, the mass of the absorbent material/zwitterionic polymer, the time of contact, etc.

The absorbent materials and methods of using the absorbent materials may be characterized by a separation efficiency η which may be defined and calculated as described in the Example below. In embodiments, the separation efficiency η is at least 80%, at least 85%, at least 90%, at least 95%, at least 98%. These separation efficiencies η may be in reference to a particular fluid mixture and conditions for carrying out the separation (e.g., temperature/pressure). (See Tables 1-6, below.)

Depending upon the desired application, the absorbent materials may be used in various devices, which are also encompassed by the present disclosure. Generally, any device having or employing a source of a fluid mixture comprising fluids having different polarities may be used. As described above, one such application involves separating such fluid mixtures of fluids. The absorbent materials may be incorporated into separation devices comprising other components for carrying out the separation, e.g., containers, fluid conduits, inlets, outlets, etc. (See FIG. 10.)

Figure 14:
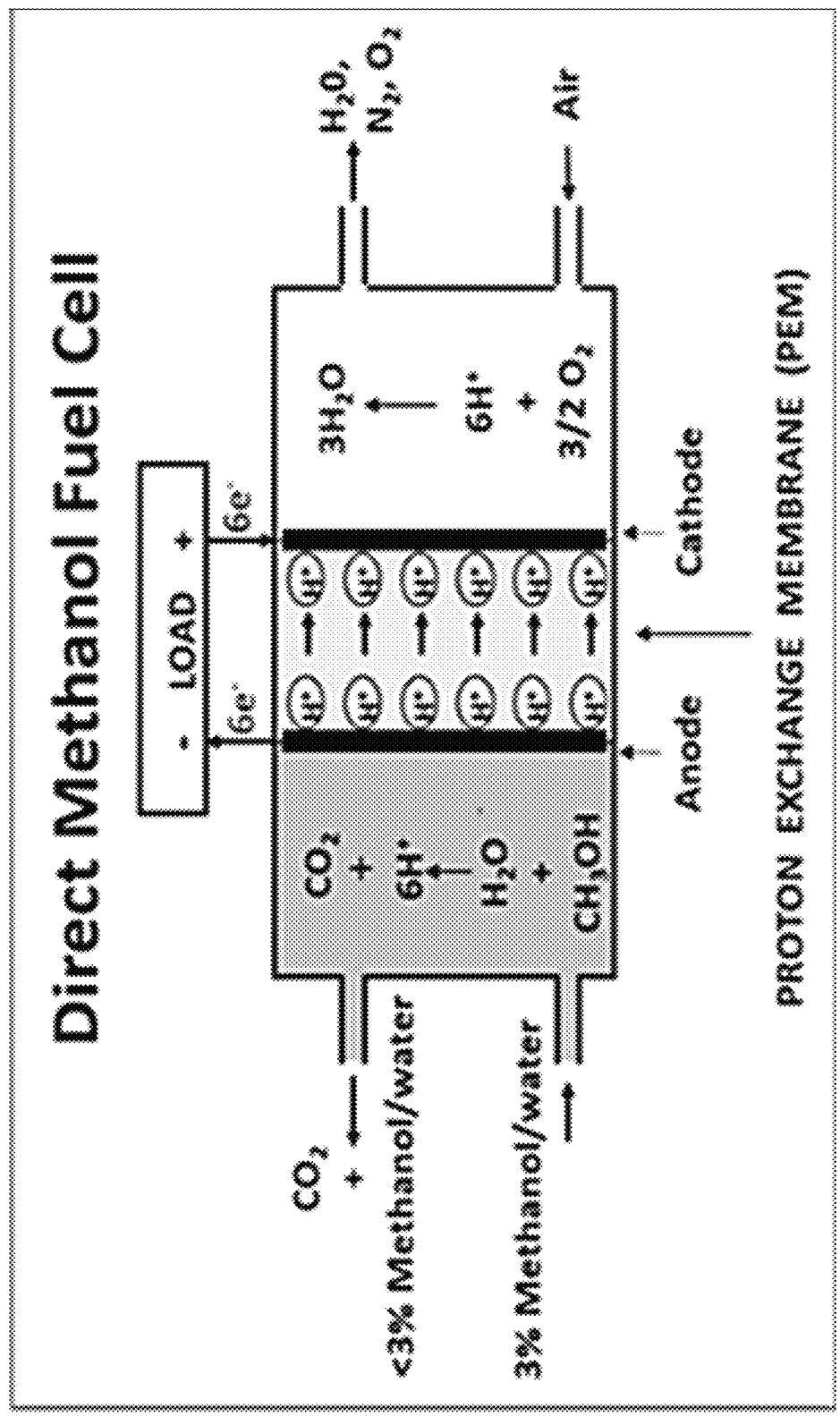
FIG. 14 depicts a schematic of an illustrative direct methanol fuel cell.

Fuel cells are another device in which the absorbent materials may be used. The absorbent materials may be used as, or incorporated into, the proton exchange membranes of such fuel cells. By way of illustration, in the direct methanol fuel cell of FIG. 14, the absorbent material may be used as, or incorporated into the PEM between the anode and the cathode. When contacted with a fluid mixture comprising methanol and water on the anode side, the absorbent material selectively absorbs the water while minimizing (including preventing) crossover of methanol to the cathode side. This improves the stability and performance of such fuel cells. As another example, retaining absorbed water within the PEM (or similar membranes in similar fuel cells) is useful to enable the fuel cell to be operated at harsh conditions where water loss in the membrane is otherwise exacerbated.

EXAMPLES

Synthesizing Zwitterionic Polymers

Synthesizing carboxybetaine methacrylate (CBMA) zwitterionic monomer: Here, CBMA was utilized as a zwitterionic monomer. CBMA monomers were synthesized by reacting 2-(N,N'-dimethylamino)ethyl methacrylate (DMAEM) and β-propiolactone in acetone (FIG. 1). Briefly, β-propiolactone mixed in acetone (87 mg/mL) was added dropwise to a solution of DMAEM dissolved in acetone (32 mg/mL). The resulting solution was stirred under nitrogen purge at 15° C. for 5 hours (h). The white precipitate was washed with anhydrous acetone and anhydrous ether followed by drying at room temperature. The obtained CBMA monomer was kept at ≈5° C. before it was used for polymerization.

Polymerizing CBMA monomer: CBMA monomers were polymerized by using a free-radical polymerization in which an initiator, accelerator, cross-linker, and monomers were mixed. Here, two CBMA-based polymers were synthesized. Potassium persulfate (KPS), N,N,N',N'-tetramethylethylenediamine (TEMED), and hydroxyethyl methacrylate (HEMA) were used as initiator, accelerator, and crosslinker, respectively. The resulting polymer was termed CBMA-HEMA. Separately, polyethylene glycol methacrylate (PEGMA) and activated Polydopamine (PDA) were utilized as a crosslinker and initiator, respectively. The resulting polymer was termed CBMA-PEGMA-PDA.

CBMA-HEMA: 130 mg of HEMA, 2500 mg of CBMA, and 7 mg of the KPS were added to 5 mL of water at 23° C. (room temperature) followed by stirring for 5 mins. Subsequently, TEMED was added to the solution and stirred for another 5 mins. The mixture was then poured into a mold made of Polydimethylsiloxane (PDMS) to make a cubic structure absorbent or dip-coated to a porous media to make a filter membrane (FIG. 2).

CBMA-PEGMA-PDA copolymer: CBMA (500 mg/mL) and polyethylene glycol methacrylate (PEGMA, 10 wt %, with respect to the CBMA mass) were dissolved in 5 mL of deionized (DI) water (CBMA-PEGMA solution). A PDA solution (10 wt %, relative to the CBMA mass) in water was prepared separately (1 mL) at room temperature (23° C.) (PDA solution). The PDA solution was added to a CBMA-PEGMA solution. The CBMA-PEGMA-PDA solution was stirred for 1 h and degassed for 30 minutes. Finally, the solution was used as a coating solution for porous media such as a filter. The coated filter was left at room temperature (23° C.) for 12 h for polymerization (FIG. 3).

Fabricating membranes and absorbents: A cubic structure of absorbent was fabricated by pouring a solution of CBMA-HEMA into a predetermined mold (≈2 cm×1 cm ×1 cm or ≈0.5 cm×1 cm×1 cm) followed by polymerization at room temperature for 24 hr. A membrane was also fabricated by a simple dip-coating of porous media (e.g., filter paper, steel mesh, Nafion membrane, polyethersulfone) with a solution of CBMA-PEGMA-PDA. Note that the coating solution concentration was 600 mg/mL for all experiments. The coated membranes were kept at room temperature (23° C.) for 12 hr.

Separation of Liquid Mixtures

Figure 4:
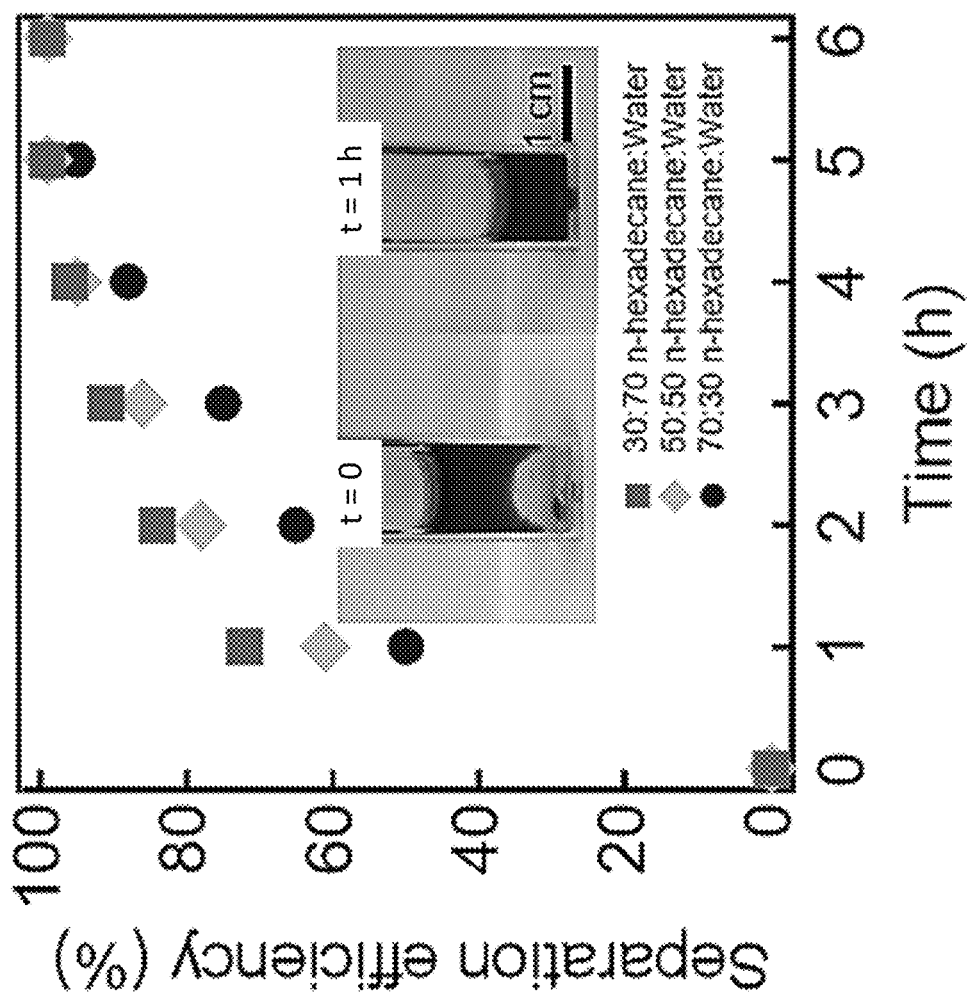
FIG. 4 depicts oil-water separation efficiency of zwitterionic polymer as a function of immersion time of zwitterionic polymer absorbent on the n-hexadecane-water mixture. The inset shows images of a 70:30 n-hexadecane-water mixture at t=0 and t=1 h.

Separation of immiscible oil-water mixtures: Three mixtures of n-hexadecane (oil) and water were prepared with compositions of 30:70, 50:50, and 70:30 (n-hexadecane: water, volumetric ratio). The total volume of each mixture was 1.0 mL. A zwitterionic polymer absorbent (≈0.5 cm×1 cm×1 cm) was submerged in a n-hexadecane-water mixture. The mass of the absorbent and the liquid mixture were measured every 1 h. The separation efficiency was calculated by the following equation: separation efficiency $(\%)=\Delta m_z/m_i \times 100$, where mi is the mass of the water in the mixture and Amz is the change in the mass of absorbent at the time of measurement. FIG. 4 shows the time-dependent separation efficiency of the zwitterionic polymer absorbent for the n-hexadecane-water mixture with varied compositions. It clearly shows that the zwitterionic polymer absorbent can remove almost all water from the mixture after 6 h.

Separation of miscible liquid mixtures: Separation of miscible liquid mixtures such as alcohol-water and alcohol-glycerol via selective absorption of one liquid over another is challenging. This is primarily because miscible liquids typically possess similar physical and/or chemical properties that make them difficult to separate. Here, it was demonstrated that the CBMA-based membrane and absorbent can separate a variety of miscible liquid mixtures by absorbing one liquid while repelling another.

Mixtures of alcohol and water with varied compositions were prepared. The total volume of each mixture was 5 mL. The absorbent (≈2 cm ×1 cm×1 cm) was immersed in the mixture. The refractive index (RI) values of the mixture, the mass of the absorbent, and the resulting mixture were measured every 1 h. The measured RI value was compared with a calibration curve of the RI as a function of alcohol-water composition. This allowed the composition of the remaining mixture to be determined after separation. The mass of the absorbent was also measured as a function of time. The increase in the mass of the absorbent was attributed to the absorption of water which was corroborated by the RI measurements. Here, separation experiments were conducted for methanol-water (MeOH-water), ethanol-water (EtOH-water), 2-propanol-water (IPA-water), and glycerol-methanol (glycerol-MeOH) mixtures.

Figures 5A, 5B:
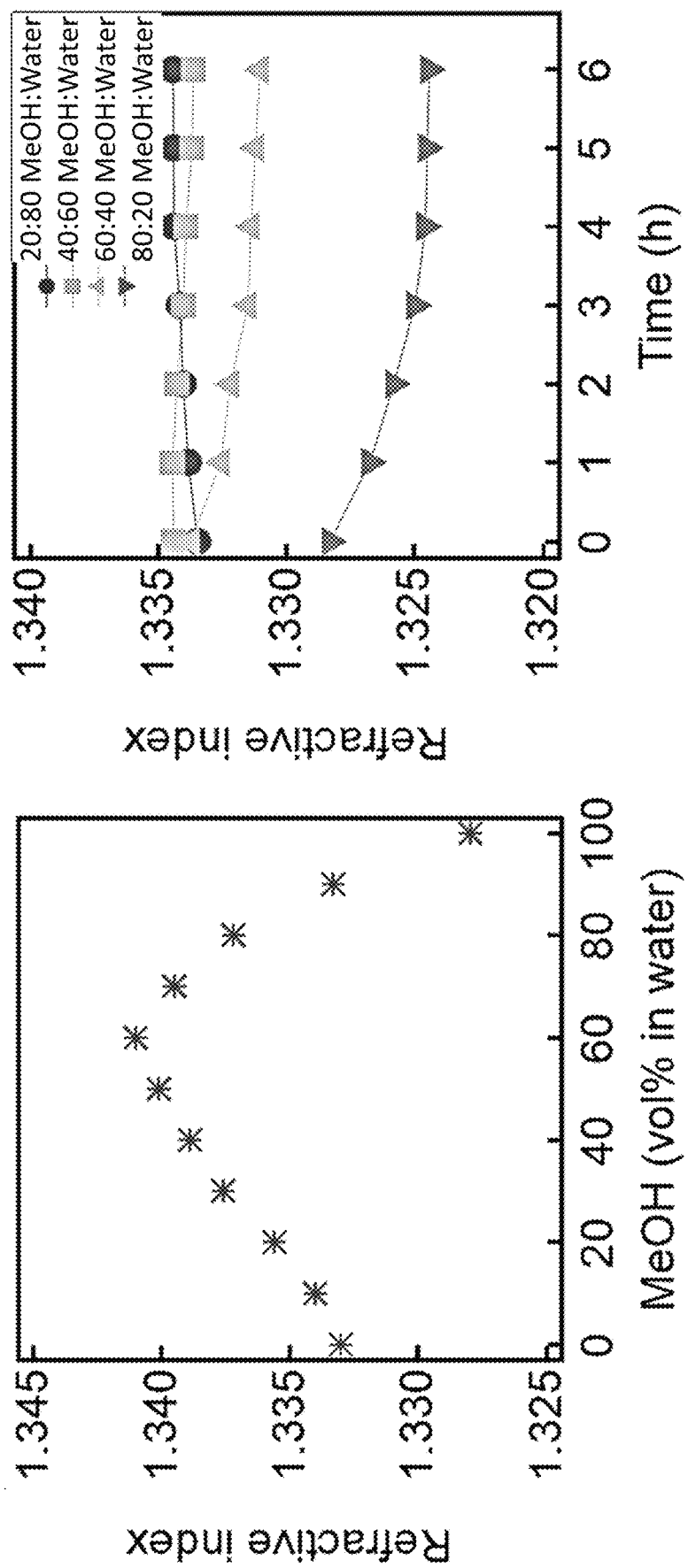
FIG. 5A depicts a calibration curve for different MeOH-water ratio compositions.
FIGS. 5B-5C depict the measured RI values and the mass of the absorbent as a function of immersion time. Please note that MeOH-water mixtures with varied volumetric compositions were used to conduct the separation experiment.
Figure 5C:
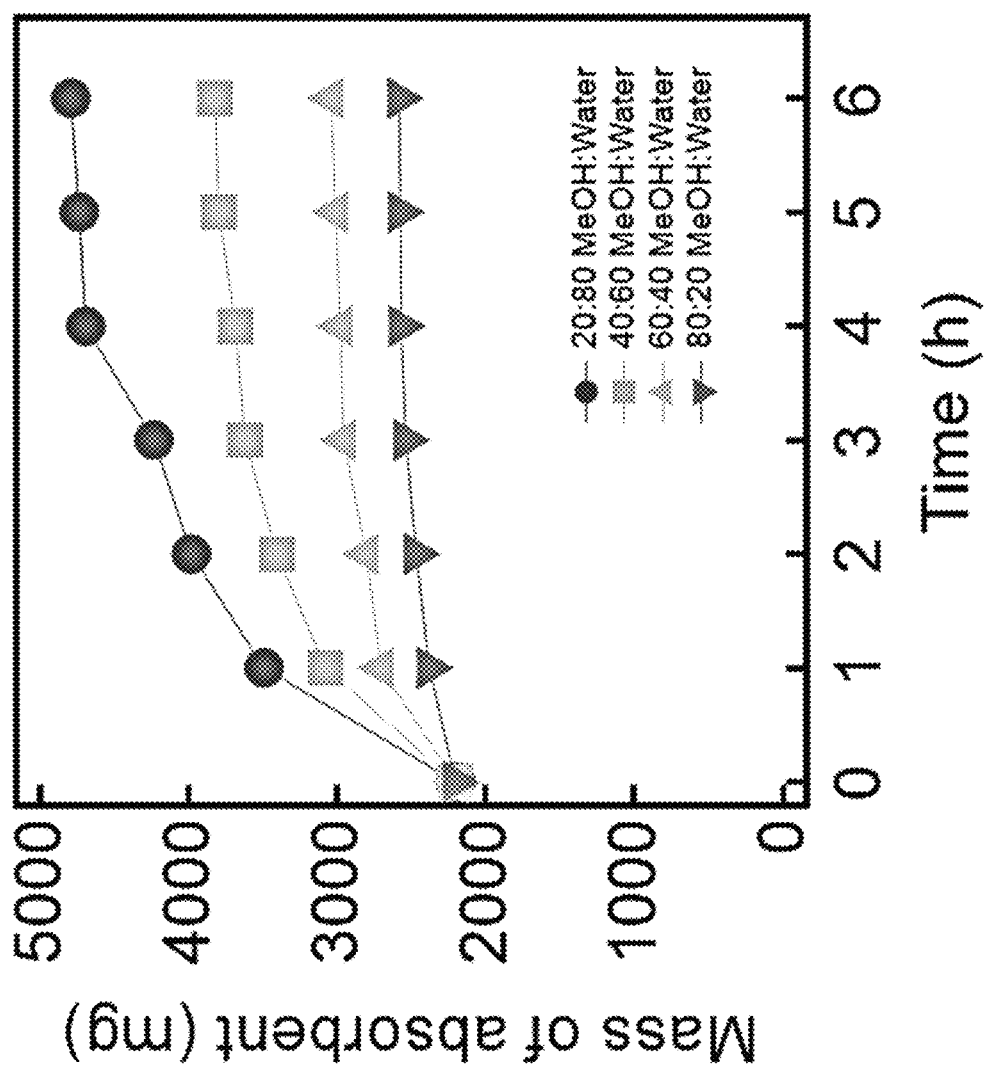

MeOH-water mixture: FIG. 5A shows a calibration curve of the RI values as a function of MeOH and water volumetric ratio. FIGS. 5B and 5C show the measured RI values and the mass of absorbent as a function of immersion time, respectively. It was found that the RI values and the absorbent mass became almost unchanged after t=6 h. By comparing the measured RI values with a calibration curve, the composition of the retentate mixture can be determined. This composition of retentate was crosschecked by the mass balance relationship. In the mass balance relationship, the mass of the alcohols in the initial mixture ($m_a$), the mass of the water in the initial mixture ($m_w$), and the change in the mass of the absorbent ($\Delta m_z$) were measured at every 1 h. Utilizing these parameters and Equation 1, the vol % of the alcohol in the retentate (composition of retentate) was calculated.

$$vol\ \%\ \text{of alcohol in the mixture} = \frac{m_a/\rho_a}{m_w/\rho_w + m_u/\rho_a - \Delta m_z/\rho_w} \quad (1)$$

where $\rho_w$ and $\rho_a$ are the density of water and alcohol. The separation efficiency was calculated based on the final alcohol mass and increase in mass of the absorbent, which was given by the equation: separation efficiency $(\eta, \%)=m_a/(m_a+m_w-\Delta m_z)\times 100$. Table 1 lists the measured values of RI, the mass of absorbent, and the separation efficiency.

TABLE 1

The measured RI values and the absorbent mass at t = 0 and after t = 6 h of immersion in the MeOH-water mixture with varied compositions.

| MeOH and Water ratio (vol:vol) | Refractive Index Measurement | | | | Mass Measurement | | | |
|---|---|---|---|---|---|---|---|---|
| (t = 0) | Refractive Index (t = 0) | Refractive Index (t = 6 h) | MeOH:Water composition (t = 6 h) | | Mass of absorbent (t = 0) (mg) | Mass of absorbent (t = 6 h) (mg) | MeOH:Water composition (t = 6 h) | η |
| 80:20 | 1.3372 | 1.3348 | 84:16 | | 2251 | 2716 | 88:12 | 88% |
| 60:40 | 1.3410 | 1.3401 | 68:32 | | 2333 | 3296 | 74:26 | 74% |
| 40:60 | 1.3389 | 1.3407 | 55:45 | | 2411 | 4039 | 60:40 | 60% |
| 20:80 | 1.3356 | 1.3378 | 36:64 | | 2318 | 4846 | 40:60 | 40% |

Figure 6A:
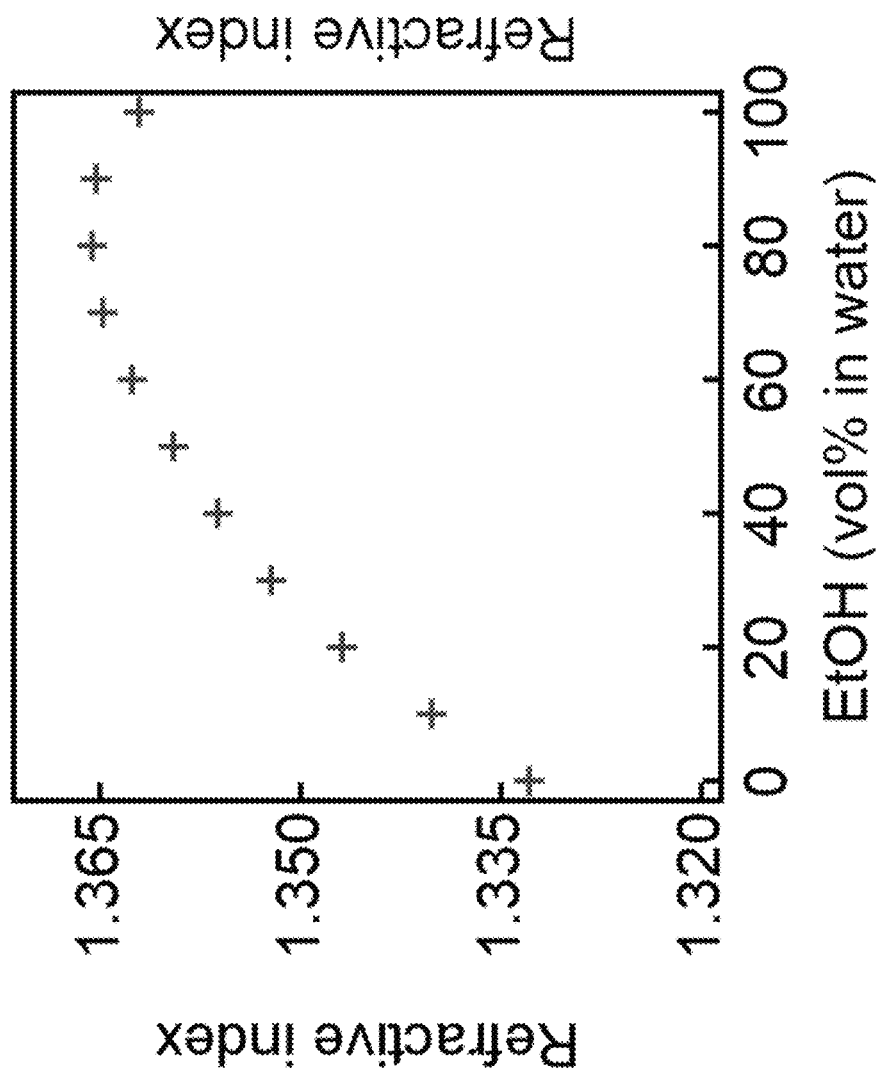
FIG. 6A depicts a calibration curve for different EtOH-water ratio compositions.
Figure 6B:
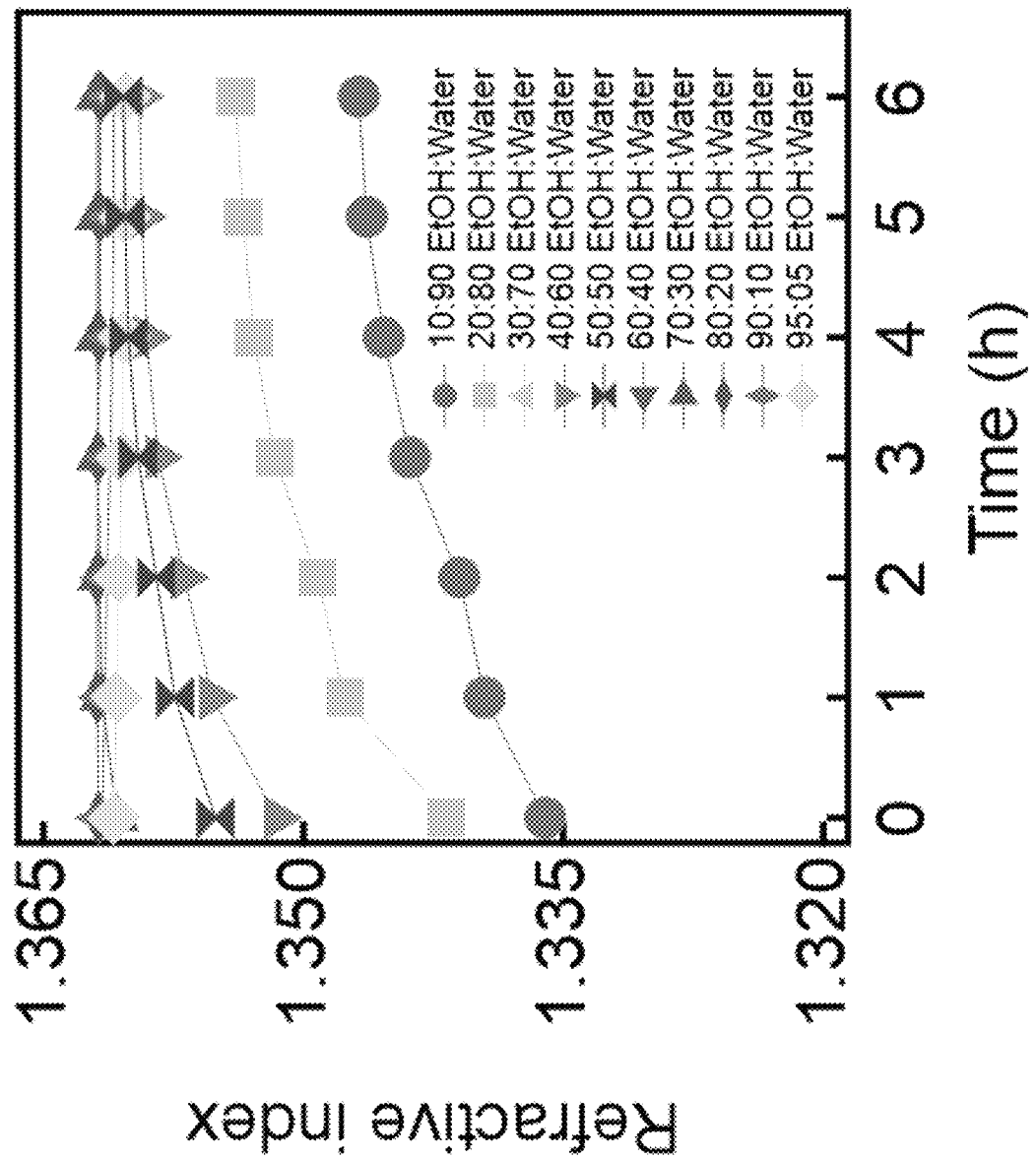
FIGS. 6B-6C depict the measured RI values and the mass of the absorbent as a function of immersion time, respectively. Please note that EtOH-water mixtures with varied volumetric compositions were used.
Figure 6C:
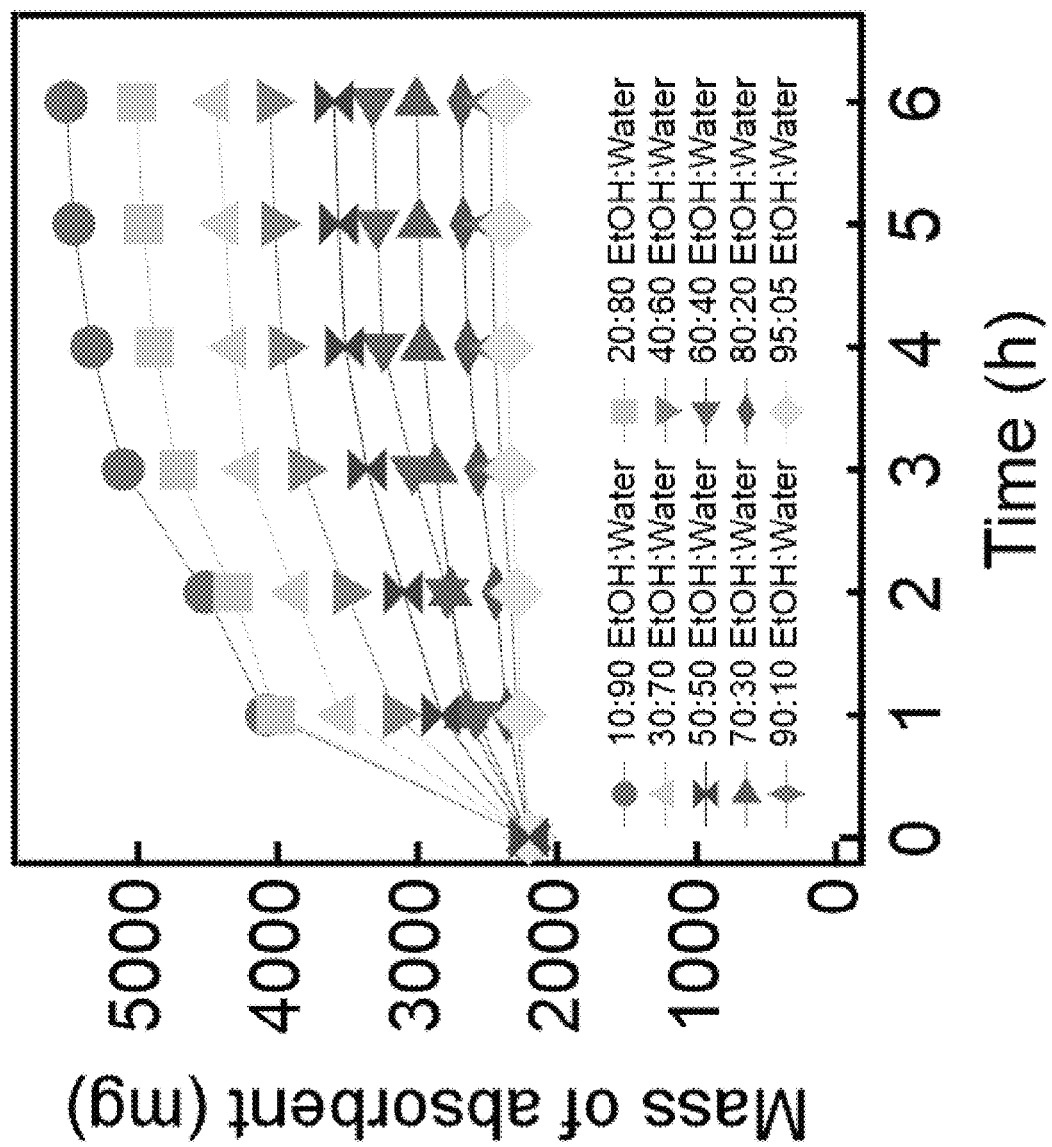

EtOH-water mixture: FIG. 6A shows a calibration curve of the RI values as a function of EtOH and water volumetric ratio. FIGS. 6B-6C show the measured RI values and the mass of absorbent as a function of immersion time. Similar to the MeOH-water mixture, the RI and the absorbent mass became almost unchanged after t=6 h. Table 2 lists the measured values of RI, the mass of absorbent, and the separation efficiency.

TABLE 2

The measured RI values and absorbent mass at t = 0 and after t = 6 h of immersion in the EtOH-water mixture with varied compositions.

| EtOH and Water ratio (vol:vol) (t = 0) | Refractive Index Measurement | | | Mass Measurement | | | |
|---|---|---|---|---|---|---|---|
| | Refractive Index (t = 0) | Refractive Index (t = 6 h) | EtOH:Water composition (t = 6 h) | Mass of absorbent (t = 0) (mg) | Mass of absorbent (t = 6 h) (mg) | EtOH:Water composition (t = 6 h) | η |
| Azeotrope (≈95:05) | 1.3615 | 1.3605 | 98:02 | 2287 | 2460 | 98:02 | 98% |
| 90:10 | 1.3632 | 1.3618 | 94:6 | 2260 | 2533 | 95:05 | 95% |
| 80:20 | 1.3638 | 1.3625 | 86:14 | 2207 | 2692 | 89:11 | 89% |
| 70:30 | 1.3635 | 1.3638 | 80:20 | 2225 | 3033 | 84:16 | 84% |
| 60:40 | 1.3605 | 1.3632 | 69:31 | 2220 | 3155 | 74:26 | 74% |
| 50:50 | 1.3586 | 1.3605 | 60:40 | 2268 | 3663 | 70:30 | 70% |
| 40:60 | 1.3550 | 1.3595 | 55:45 | 2384 | 4240 | 64:36 | 64% |
| 30:70 | 1.3518 | 1.3552 | 40:60 | 2389 | 4110 | 46:54 | 46% |
| 20:80 | 1.3435 | 1.3522 | 32:68 | 2267 | 5082 | 40:60 | 40% |
| 10:90 | 1.3390 | 1.3476 | 25:75 | 2228 | 5543 | 30:70 | 30% |

Figure 7A:
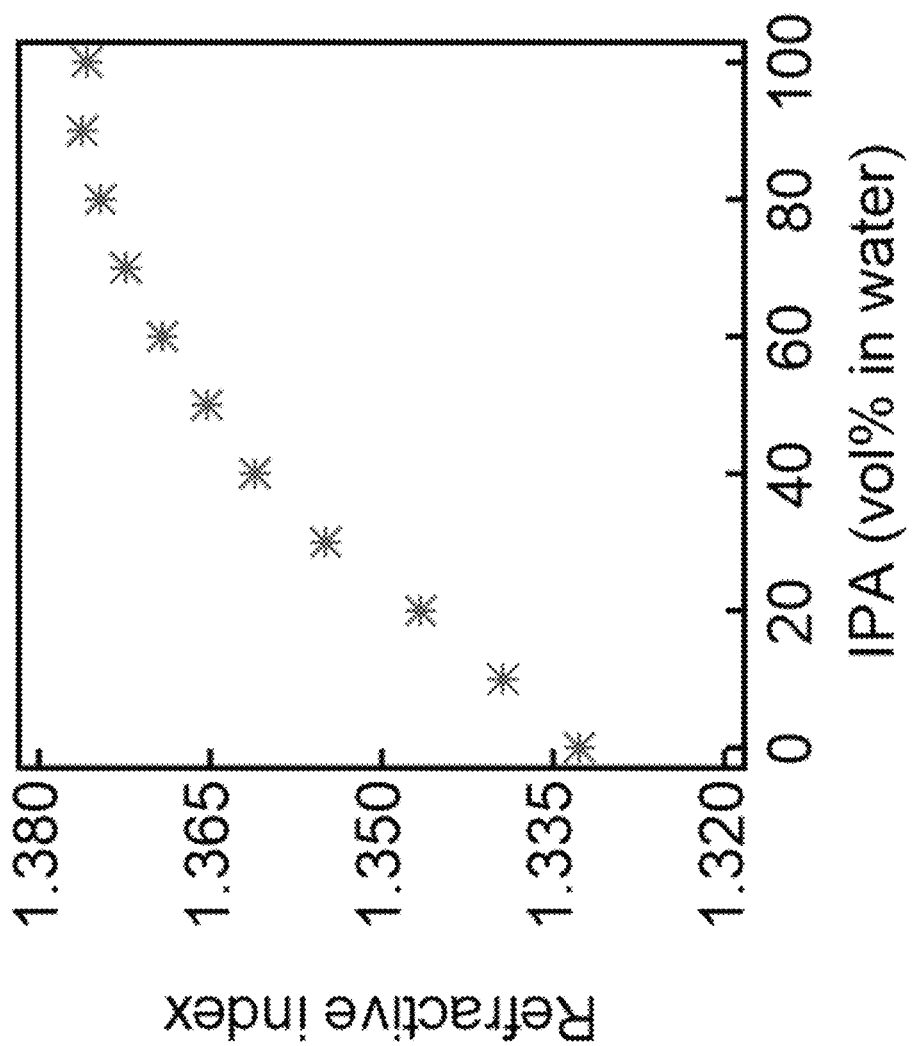
FIG. 7A depicts a calibration curve for different IPA-water ratio compositions.
Figure 7B:
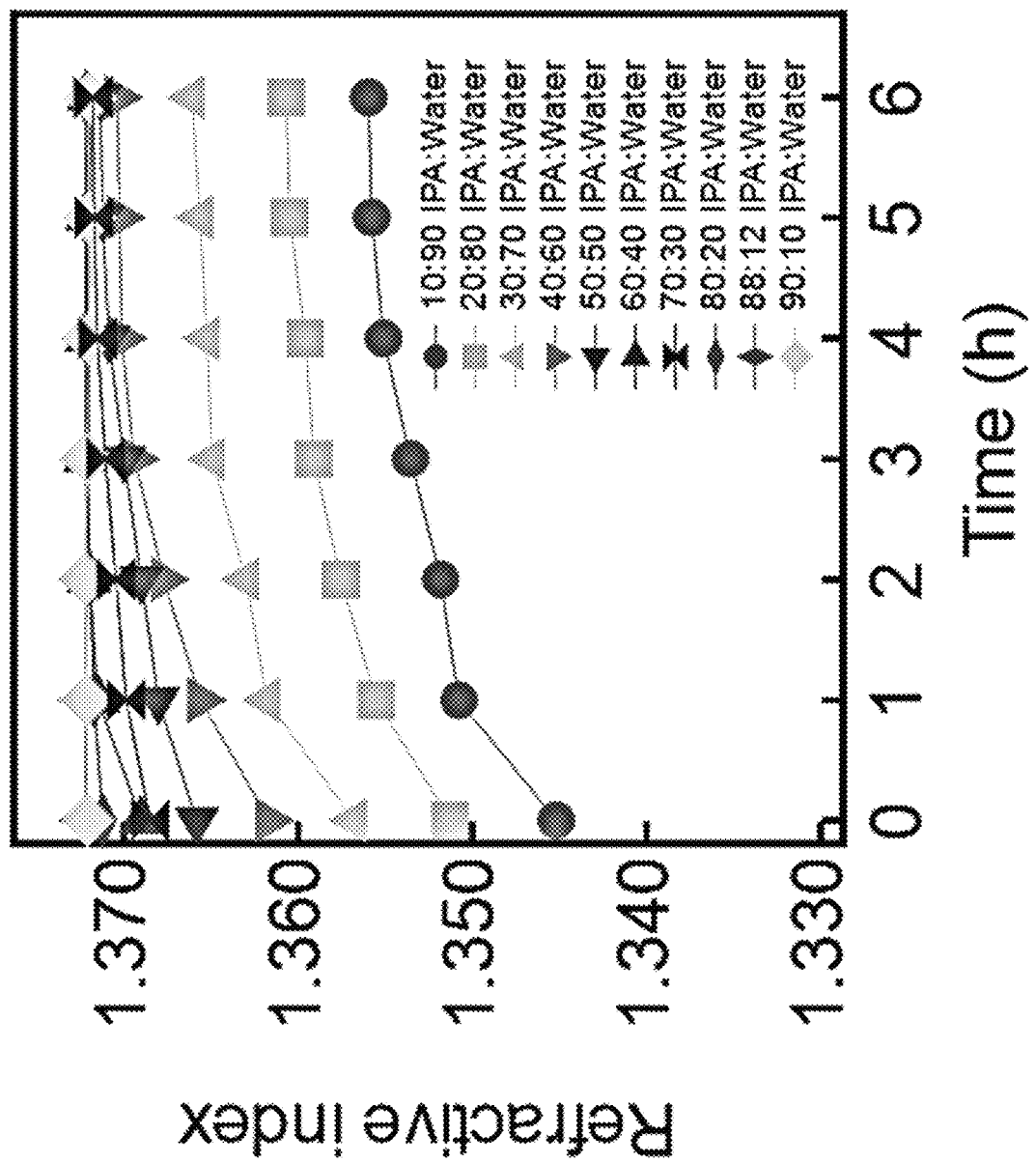
FIGS. 7B-7C depict the measured RI values and the mass of the absorbent as a function of immersion time, respectively. Please note that IPA-water mixtures with varied volumetric compositions were used.
Figure 7C:
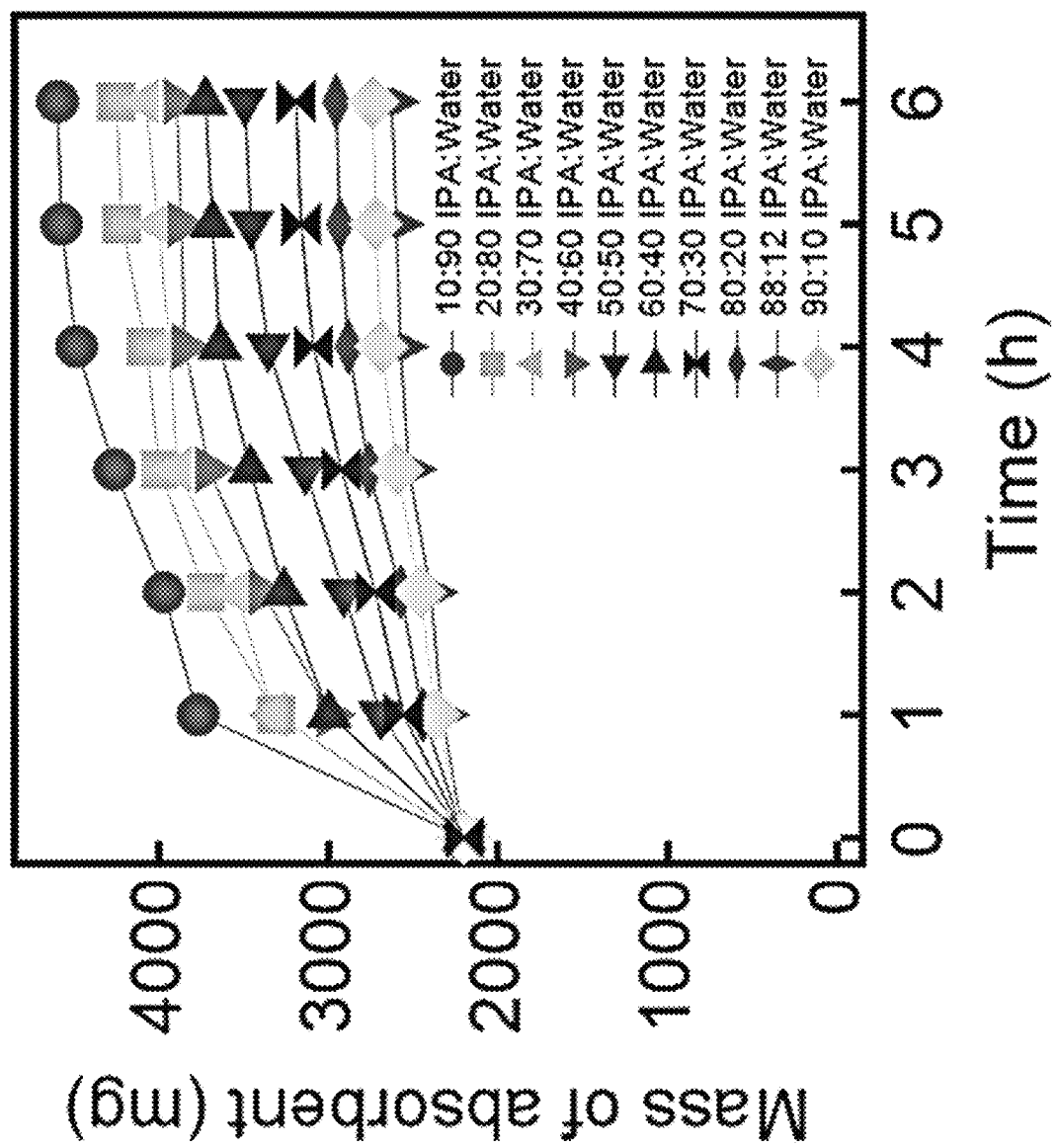

IPA-water mixture: FIG. 7A shows a calibration curve of RI values as a function of IPA and water volumetric ratio. FIGS. 7B-7C show the measured RI values and the mass of absorbent as a function of immersion time. The RI and the absorbent mass became almost unchanged after t=6 h. Table 3 lists the measured values of RI, the mass of absorbent, and the separation efficiency.

TABLE 3

The measured RI values and absorbent mass at t = 0 and after t = 6 h of immersion in the IPA-water mixture with varied compositions.

| IPA and Water ratio (vol:vol) (t = 0) | Refractive Index Measurement | | | Mass Measurement | | | |
|---|---|---|---|---|---|---|---|
| | Refractive Index (t = 0) | Refractive Index (t = 6 h) | IPA:Water composition (t = 6 h) | Mass of absorbent (t = 0) (mg) | Mass of absorbent (t = 6 h) (mg) | IPA:Water composition (t = 6 h) | η |
| Azeotrope (≈88:12) | 1.3756 | 1.3758 | 97:03 | 2223 | 2650 | 96:04 | 96% |
| 90:10 | 1.3762 | 1.3758 | 98:02 | 2399 | 2890 | 99:01 | 99% |
| 80:20 | 1.3750 | 1.3765 | 91:09 | 2373 | 3059 | 93:07 | 93% |
| 70:30 | 1.3724 | 1.3761 | 90:10 | 2418 | 3407 | 87:13 | 87% |
| 60:40 | 1.3699 | 1.3744 | 77:23 | 2328 | 3619 | 81:19 | 81% |
| 50:50 | 1.3658 | 1.3732 | 71:29 | 2284 | 3669 | 70:30 | 70% |
| 40:60 | 1.3616 | 1.3671 | 55:45 | 2240 | 3933 | 61:39 | 61% |
| 30:70 | 1.3551 | 1.3625 | 42:58 | 2310 | 4016 | 45:55 | 45% |
| 20:80 | 1.3466 | 1.3559 | 31:69 | 2291 | 4154 | 32:68 | 32% |
| 10:90 | 1.3394 | 1.3455 | 19:81 | 2221 | 4617 | 19:81 | 19% |

Figure 8A:
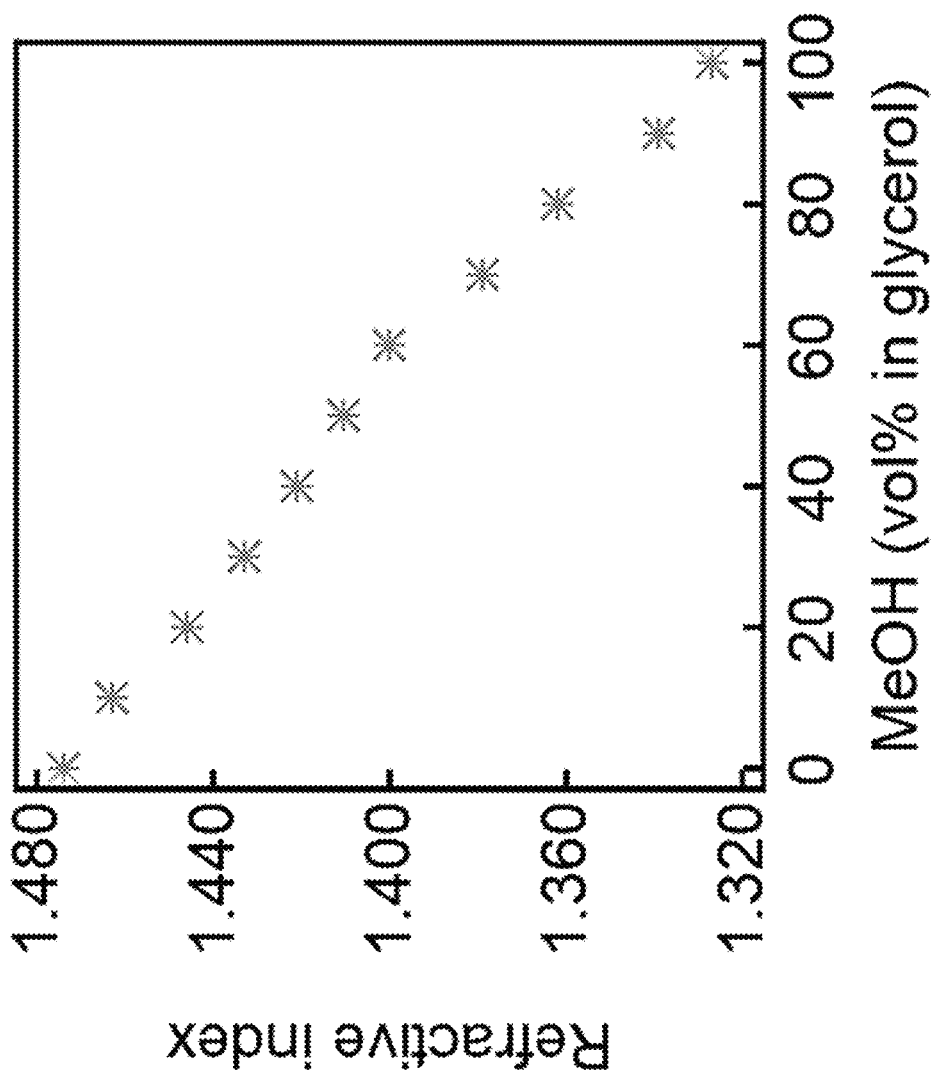
FIG. 8A depicts a calibration curve for different Glycerol-MeOH ratio compositions.
Figure 8B:
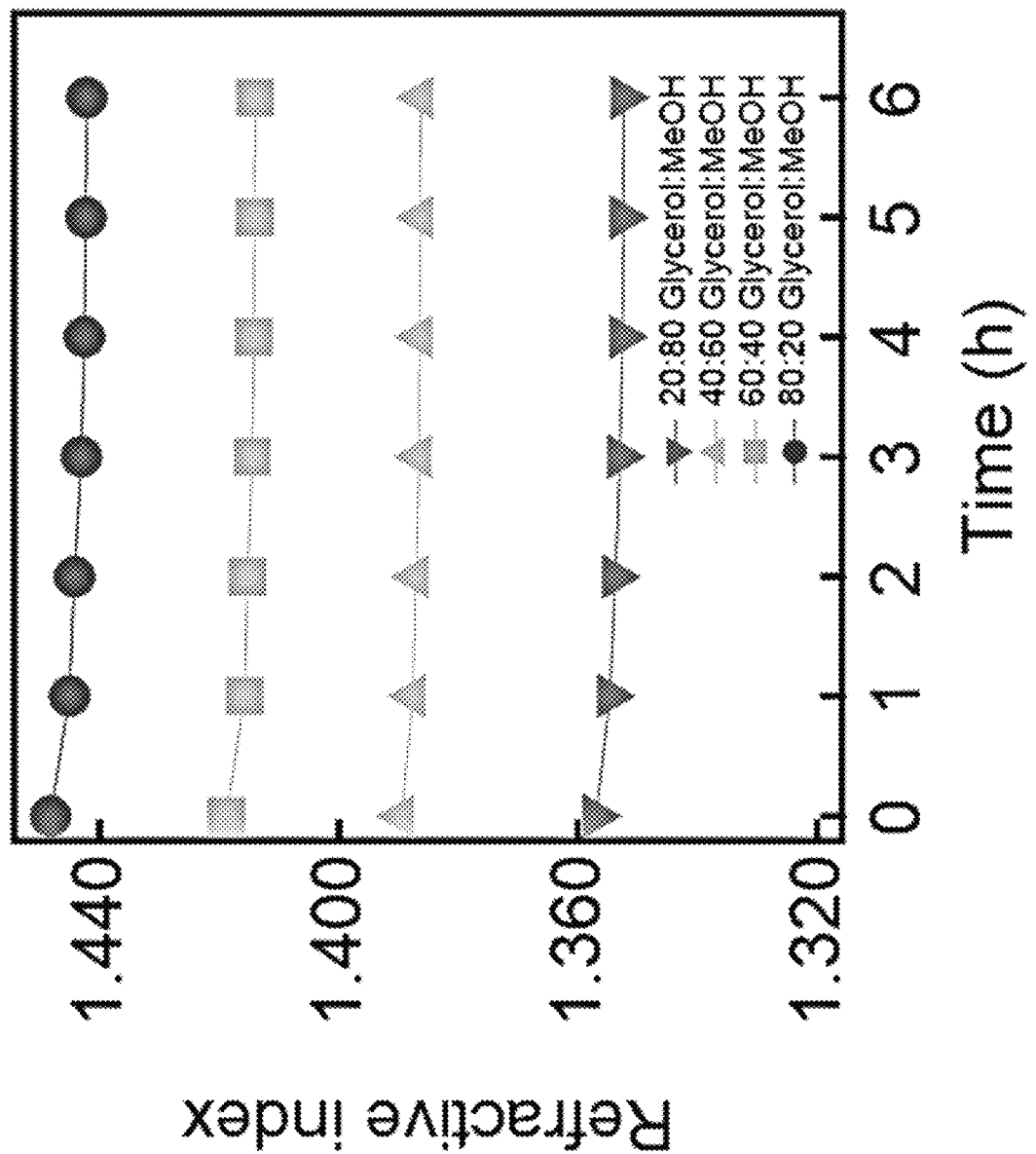
FIGS. 8B-8C depict the measured RI values and the mass of the absorbent as a function of immersion time, respectively. Please note that Glycerol-MeOH mixtures with varied volumetric compositions were used.
Figure 8C:
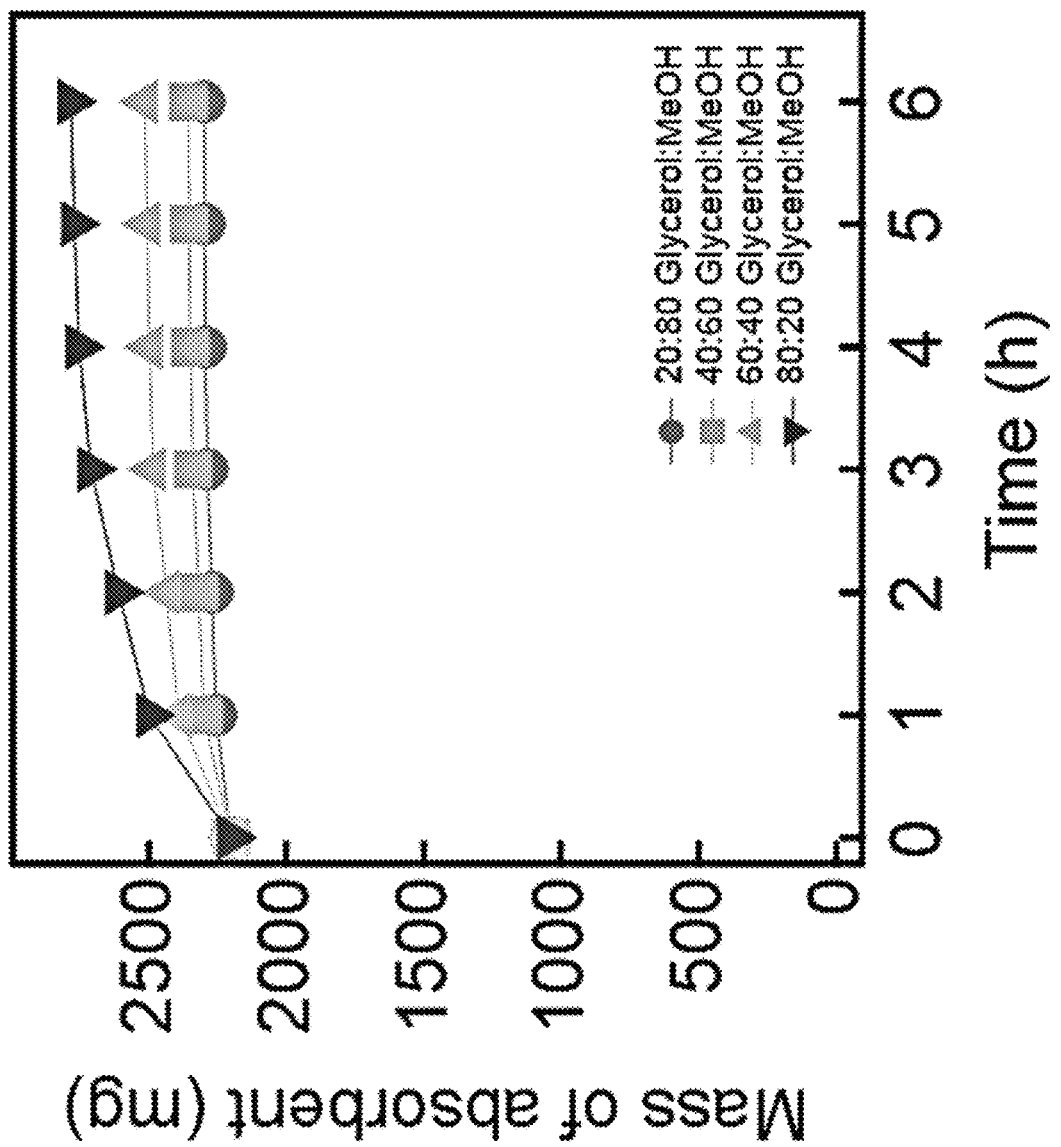

Glycerol-MeOH mixture: FIG. 8A shows a calibration curve of RI values as a function of MeOH and glycerol volumetric ratio. FIGS. 8B-8C show the measured RI values and the mass of absorbent as a function of immersion time. Similar to previous mixtures, the RI and the absorbent mass became almost unchanged after t=6 h. Table 4 lists the measured values of RI, the mass of absorbent, and the separation efficiency.

TABLE 4

The measured RI values and absorbent mass at t = 0 and after t = 6 h of immersion in glycerol and the MeOH mixture with varied compositions.

| Glycerol and MeOH ratio (vol:vol) (t = 0) | Refractive Index Measurement | | | Mass Measurement | | | |
|---|---|---|---|---|---|---|---|
| | Refractive Index (t = 0) | Refractive Index (t = 6 h) | Glycerol:MeOH composition (t = 6 h) | Mass of absorbent (t = 0) (mg) | Mass of absorbent (t = 6 h) (mg) | Glycerol:MeOH composition (t = 6 h) | η |
| 80:20 | 1.4482 | 1.4421 | 75:25 | 2308 | 3261 | 76:24 | 76% |
| 60:40 | 1.4182 | 1.4167 | 59:41 | 2341 | 2689 | 58:42 | 58% |
| 40:60 | 1.3880 | 1.3837 | 37:63 | 2257 | 2500 | 37:63 | 37% |
| 20:80 | 1.3583 | 1.3522 | 16:84 | 2242 | 2606 | 15:85 | 15% |

Figure 9:
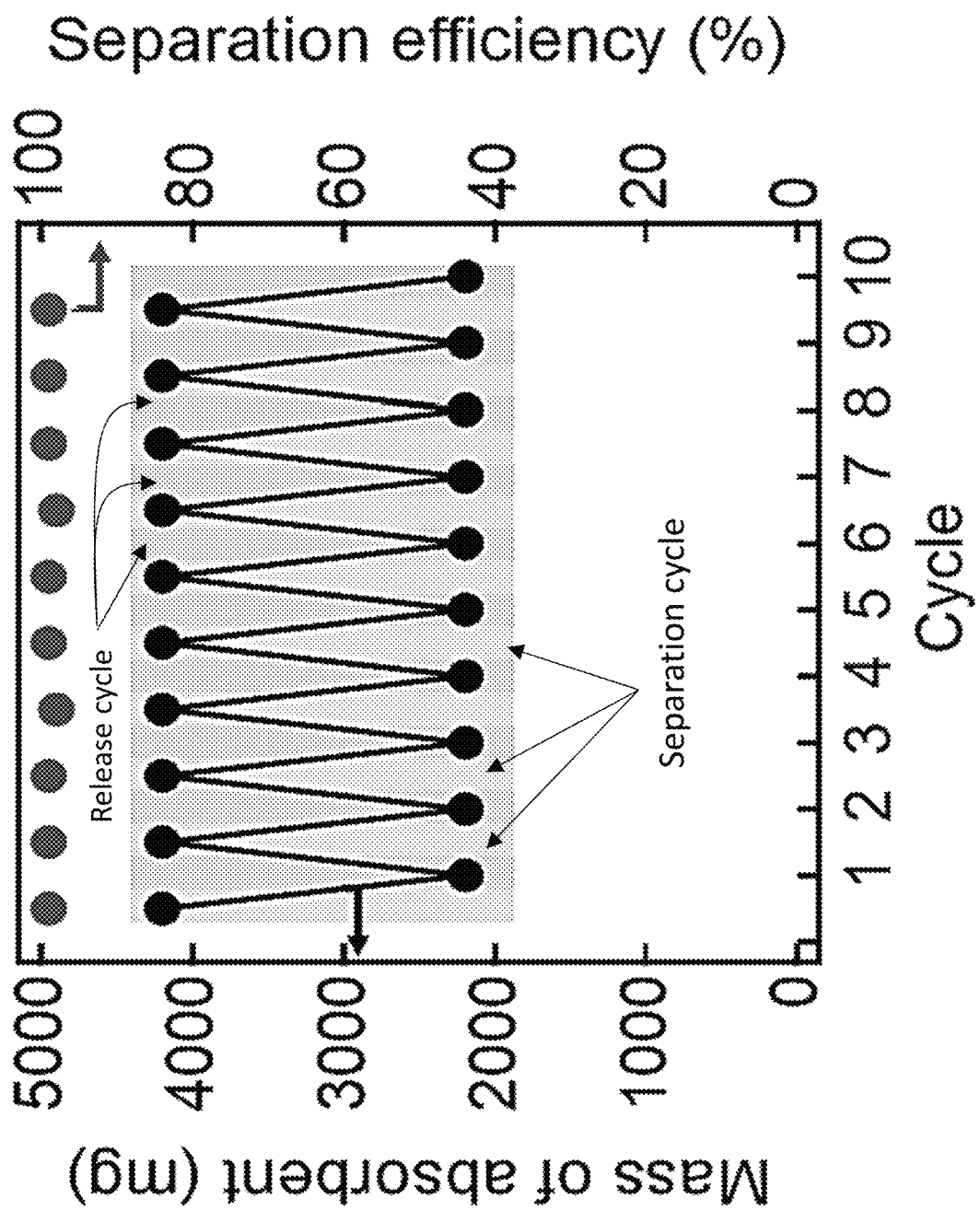
FIG. 9 depicts the measured mass of absorbent and its separation efficiency as a function of separation-release cycles.

Reusing the absorbent: It was shown that the absorbent (≈2 cm×1 cm×1 cm) could release the absorbed water when it was submerged in N-Methyl-2-pyrrolidone (NMP). Then the absorbent was reused for EtOH-water (10:90, vol:vol) separation as described above. 10 cycles of separation-release were conducted. FIG. 9 shows the mass of the absorbent and the separation efficiency upon separation-release cycles. It shows that the absorbent can release almost all absorbed water upon submerging in the NMP bath. Also, it was shown that the separation efficiency remained almost the same even after the 10$^{th}$ cycle, indicating that the absorbent's performance remained unchanged.

Separation of Liquid Mixtures by Membrane

Figure 10:
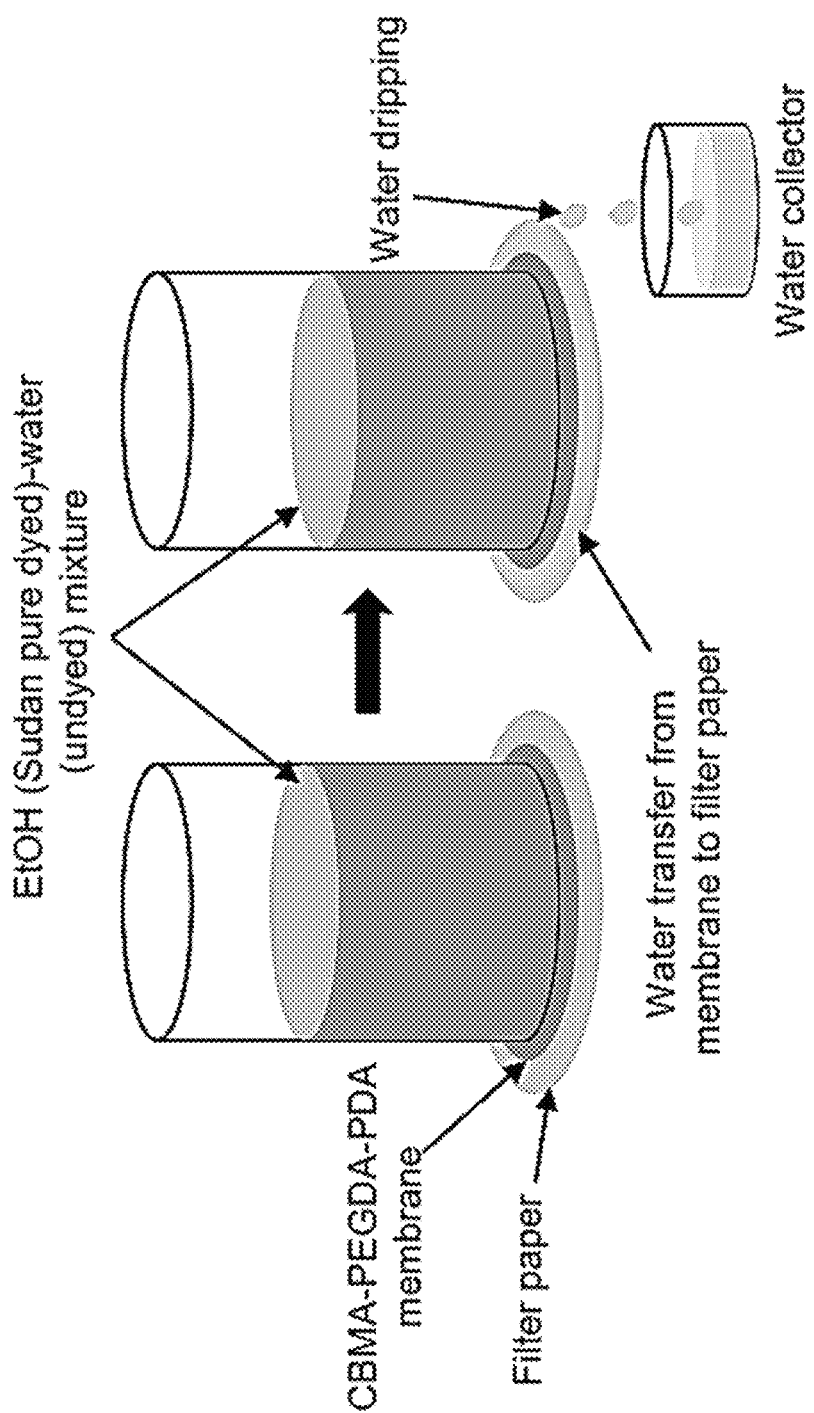
FIG. 10 depicts a schematic illustration of the setup for membrane-based alcohol-water separation using a CBMA-PEGMA-PDA coated membrane.
Figures 11A, 11B:
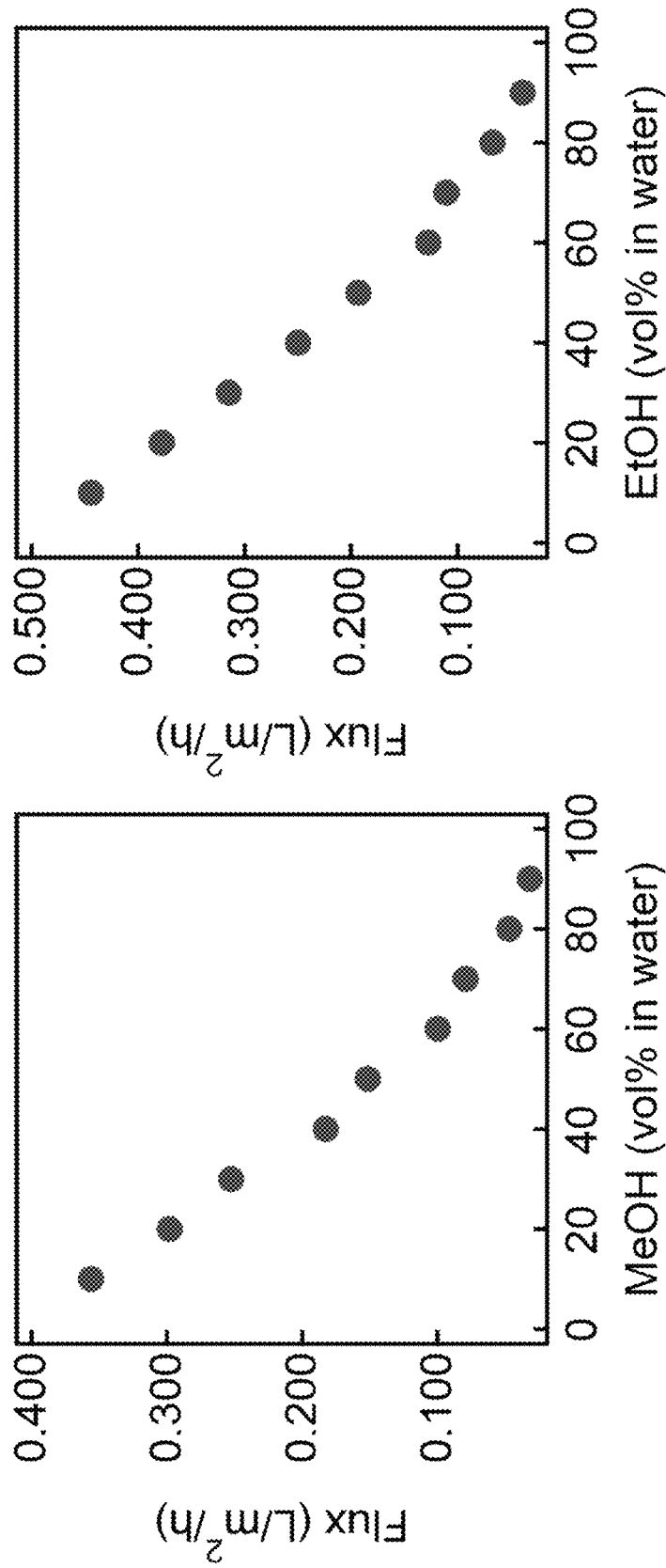
FIGS. 11A-11B depict the measured flux of the water-rich permeate through the CBMA-PEGMA-PDA coated membrane from MeOH-water (FIG. 11A) and EtOH-water (FIG. 11B) mixtures, respectively.

Separation of MeOH-water: Experiments of separation of the MeOH-water mixture were conducted by using a porous membrane coated with the zwitterionic polymer. Here, a filter paper (Whatman grade 2, nominal pore size=6 μm) was utilized as a porous medium. The filter was submerged in a solution of CBMA-PEGMA-PDA (concentration 600 mg/mL) followed by crosslinking at room temperature for 12 h. The resulting membrane was attached to the bottom of the tube. The mixture of MeOH-water (varied composition, a total of 20 mL) was poured into the tube. Please note that the peripheral of the membrane-tube interface was completely sealed by epoxy resin to prevent any leakage (FIG. 10). Upon introducing the mixture, the membrane allowed water to pass through while repelling MeOH. The RI values for the water-rich permeate and the MeOH-rich retentate were measured after 3 h. They were measured to be 1.3334 and 1.33331, respectively. These values are very close to those of pure DI water (1.3330) and MeOH (1.3280), indicating that the membrane can separate MeOH-water with very high separation efficiency (>90%). The MeOH-water mixture dependent flux through the membrane is provided in FIG. 11A.

Separation of EtOH-water: Similarly, the experiment was conducted by using an EtOH-water mixture (varied composition). The measured values for RI of the water-rich permeate and EtOH-rich retentate were found to be 1.3331 and 1.3599, respectively. These values are very close to those of pure DI water (1.3330) and EtOH (1.3592), indicating that the membrane can separate EtOH-water with very high separation efficiency (>98%). The EtOH-water mixture dependent flux through the membrane is provided in FIG. 11B.

Separation of Vapor Phase Mixtures

Figure 12:
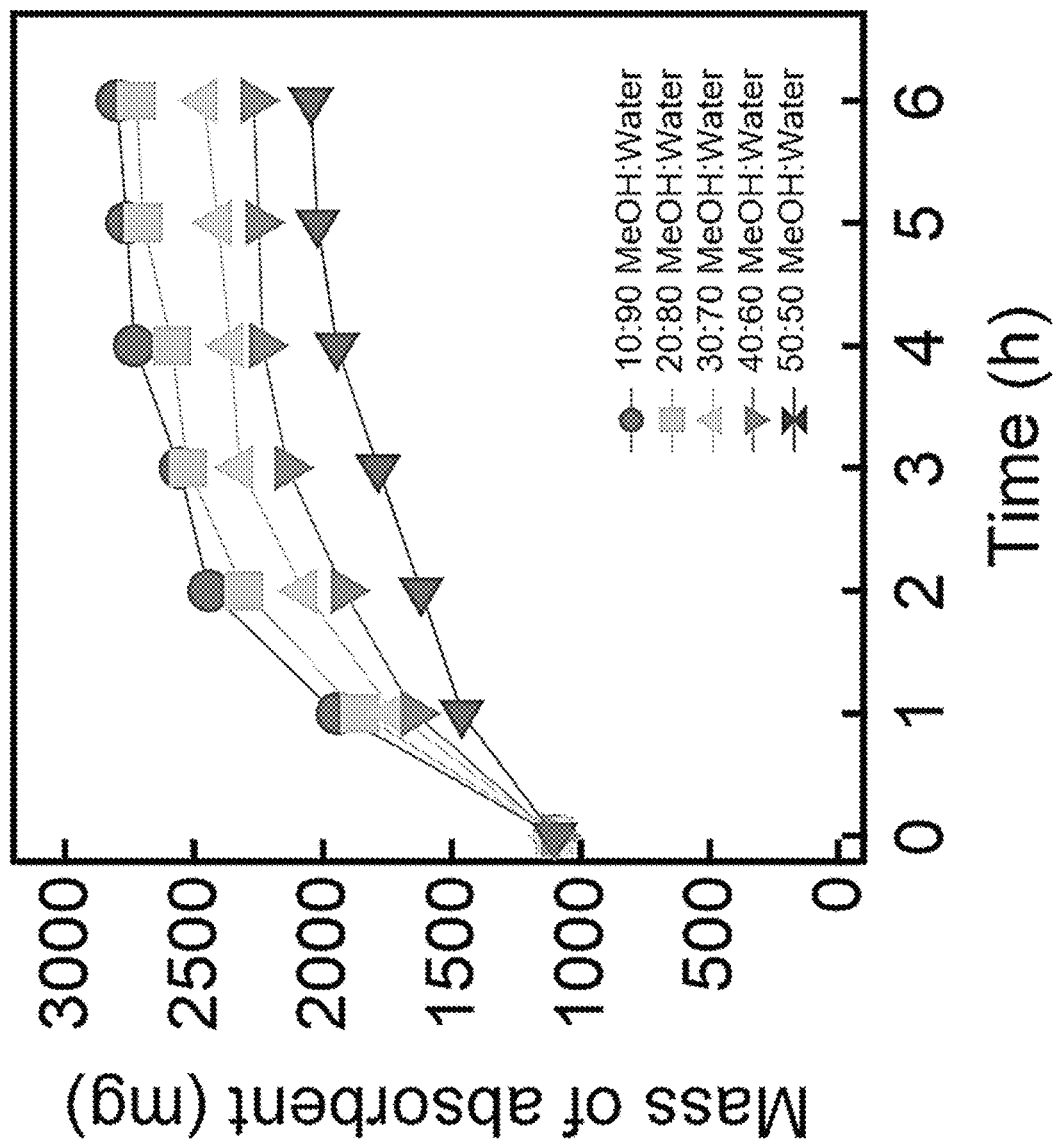
FIG. 12 depicts the measured value of the mass of the membrane as a function of vapor exposure time for MeOH-water mixture.

Separation of vapor phase MeOH-water: Experiments of separation of the vapor phase Me0H-water mixture (varied composition) were conducted by using the zwitterionic polymer (CBMA-PEGDMA-PDA) coated substrate (5 cm×5 cm). The thickness of the zwitterionic polymer was 1 mm. The substrate was exposed to the vaporized MeOH-water mixture. Please note that the experiment was conducted in a sealed vessel. The mass of the substrate and the RI value of the condensed liquid on the substrate were measured every 1 h. FIG. 12 shows the mass of the absorbent every 1 h. Table 5 lists the measured values of RI, the mass of absorbent, and the separation efficiency.

TABLE 5

Results of the vapor phase MeOH-water separation experiment with refractive index values and volumetric ratio of EtOH-water mixtures before and after separation.

| MeOH and Water ratio (vol:vol) (t = 0) | Refractive Index measurement | | | Mass Measurement | | | |
|---|---|---|---|---|---|---|---|
| | Refractive Index (t = 0) | Refractive Index (condensed liquid) | MeOH:Water composition (condensed liquid) | Mass of absorbent (t = 0) | Mass of absorbent (t = 6 h) | MeOH:H$_2$O composition (condensed liquid) | η |
| 50:50 | 1.3658 | 1.3732 | 71:29 | 1100 | 2047 | 73:27 | 73% |
| 40:60 | 1.3616 | 1.3671 | 55:45 | 1203 | 2371 | 66:34 | 66% |
| 30:70 | 1.3551 | 1.3625 | 42:58 | 1127 | 2486 | 55:45 | 55% |
| 20:80 | 1.3466 | 1.3559 | 33:67 | 1134 | 2758 | 44:56 | 44% |
| 10:90 | 1.3394 | 1.3488 | 24:86 | 1185 | 2884 | 23:77 | 23% |

Figure 13:
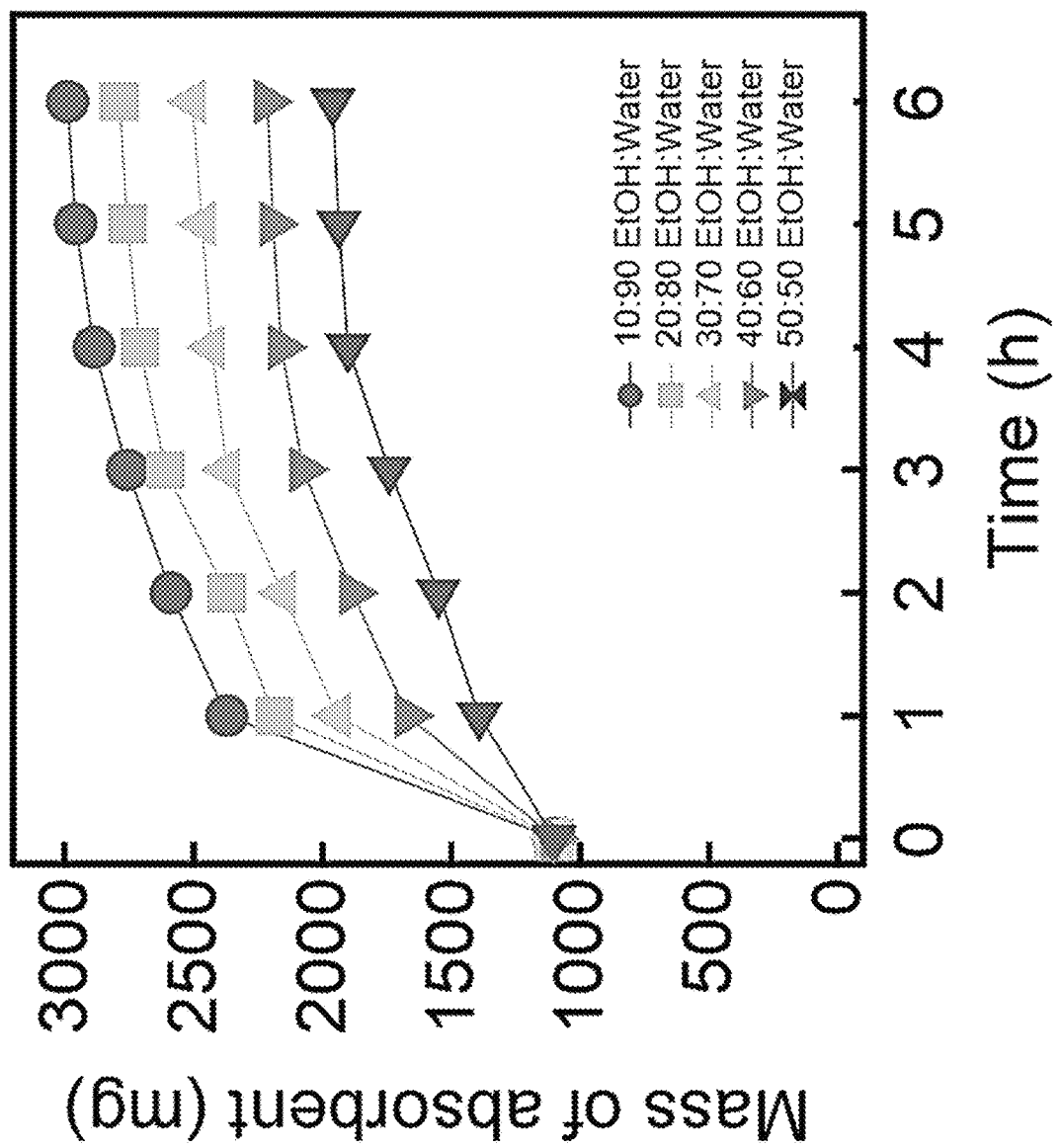
FIG. 13 depicts the measured value of the mass of the membrane as a function of vapor exposure time for EtOH-water mixture.

Separation of EtOH-water: Similarly, experiments were conducted by using the vaporized EtOH-water mixture (varied composition). FIG. 13 shows the mass of the absorbent every 1 h. Table 6 lists the measured values of RI, the mass of absorbent, and the separation efficiency.

TABLE 6

Results of the vapor phase EtOH-water separation experiment with refractive index values and volumetric ratio of EtOH-water mixtures before and after separation.

| EtOH and Water ratio (vol:vol) (t = 0) | Refractive Index Measurement | | | Mass Measurement | | | |
|---|---|---|---|---|---|---|---|
| | Refractive Index (t = 0) | Refractive Index (condensed liquid) | EtOH:Water composition (condensed liquid) | Mass of absorbent (t = 0) | Mass of absorbent (t = 6 h) | EtOH:Water composition (t = 6 h) | η |
| 50:50 | 1.3658 | 1.3732 | 71:29 | 1157 | 2018 | 70:30 | 70% |
| 40:60 | 1.3616 | 1.3671 | 55:45 | 1182 | 2296 | 64:36 | 64% |
| 30:70 | 1.3551 | 1.3625 | 42:58 | 1157 | 2562 | 56:44 | 56% |
| 20:80 | 1.3466 | 1.3559 | 33:67 | 1122 | 2811 | 46:54 | 46% |
| 10:90 | 1.3394 | 1.3488 | 24:86 | 1101 | 2990 | 27:63 | 27% |

If not already included, all numeric values of parameters in the present disclosure are proceeded by the term "about" which means approximately. This encompasses those variations inherent to the measurement of the relevant parameter as understood by those of ordinary skill in the art. This also encompasses the exact value of the disclosed numeric value and values that round to the disclosed numeric value.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more".

The foregoing description of illustrative embodiments of the disclosure has been presented for purposes of illustration and of description. It is not intended to be exhaustive or to limit the disclosure to the precise form disclosed, and modifications and variations are possible in light of the above teachings or may be acquired from practice of the disclosure. The embodiments were chosen and described in order to explain the principles of the disclosure and as practical applications of the disclosure to enable one skilled in the art to utilize the disclosure in various embodiments and with various modifications as suited to the particular use contemplated. It is intended that the scope of the disclosure be defined by the claims appended hereto and their equivalents.

What is claimed is:

1. A fuel cell comprising an anode, a cathode in electrical communication with the anode, and an absorbent material in between the anode and the cathode, the absorbent material comprising a zwitterionic polymer, the zwitterionic polymer being a polymerization product of reactants comprising a zwitterionic monomer and a (meth) acrylate crosslinker, and wherein the zwitterionic monomer is selected from the group consisting of:
   a zwitterionic monomer of Formula I, $R-(CH_2)_m-NR'_2{}^+-(CH_2)_n-A^-$, wherein R is selected from a carboxyamide, a (meth)acrylate, and an alkyl; m is an integer of from 0 to 5; each R' is independently selected from hydrogen and an alkyl; n is an integer of from 1 to 5; and $A^-$ is $SO_3^-$ or $CO_2^-$;
   a zwitterionic monomer of Formula II, $R-(CH_2)_m-A^--(CH_2)_n-NR'_3{}^+$, wherein R is an (meth)acrylate; m is an integer of from 1 to 5; A is $PO_4^-$; n is an integer of from 1 to 5; and each R' is independently selected from hydrogen and an alkyl; and
   carboxybetaine diacrylamide; (3-methacryloylamino-propyl)-(2-carboxy-ethyl)-dimethylammonium; 3-[Dimethyl-(2-hydroxyethyl)ammonio]-1-propanesulfonate; 1-methylpyridinium 3-sulfonate; and combinations thereof.

2. The fuel cell of claim 1, wherein the zwitterionic monomer has Formula I.

3. The fuel cell of claim 2, wherein R is selected from the carboxyamide and the (meth) acrylate; m is from 1 to 5; each R' is independently selected from hydrogen and the alkyl; n is from 1 to 5; and A is $SO_3^{31}$.

4. The fuel cell of claim 2, wherein R is the (meth) acrylate; m is from 1 to 5; each R' is independently selected from hydrogen and the alkyl; n is from 1 to 5; and A is $SO_3^-$.

5. The fuel cell of claim 2, wherein R is the (meth) acrylate; m is from 1 to 5; each R' is the alkyl; n is from 1 to 5; and A is $SO_3^-$.

6. The fuel cell of claim 2, wherein R is the (meth) acrylate; m is from 1 to 5; each R' is methyl; n is from 1 to 5; and A is $SO_3$.

7. The fuel cell of claim 2, wherein the zwitterionic monomer is [2-(Methacryloyloxy) ethyl]dimethyl-(3-sulfopropyl)ammonium hydroxide.

8. The fuel cell of claim 1, wherein the (meth) acrylate crosslinker is hydroxyethyl methacrylate.

9. The fuel cell of claim 1, wherein absorbent material further comprises a second (meth) acrylate crosslinker.

10. The fuel cell of claim 9, wherein the (meth)acrylate crosslinker is hydroxyethyl methacrylate and the second (meth) acrylate crosslinker is N,N'-methylenebismethacrylamide.

11. The fuel cell of claim 1, wherein the reactants consist of the zwitterionic monomer, the crosslinker, optionally, a second crosslinker, and optionally, an initiator.

12. The fuel cell of claim 11, wherein the zwitterionic monomer is [2-(Methacryloyloxy)ethyl]dimethyl-(3-sulfopropyl)ammonium hydroxide and the crosslinker is hydroxyethyl methacrylate.

13. The fuel cell of claim 12, wherein the reactants consist of the zwitterionic monomer, the crosslinker, the second crosslinker, and the initiator, wherein the second crosslinker is N,N'-methylenebismethacrylamide.

14. The fuel cell of claim 11, wherein the absorbent material consists of the zwitterionic polymer.

15. The fuel cell of claim 1, further comprising a polymer electrolyte membrane between the anode and the cathode, wherein the zwitterionic polymer is in contact with the polymer electrolyte membrane.

16. The fuel cell of claim 15, wherein the zwitterionic polymer is a coating on the polymer electrolyte membrane or fills pores within the polymer electrolyte membrane.

17. The fuel cell of claim 15, wherein the zwitterionic monomer has Formula I.

18. The fuel cell of claim 17, wherein R is the (meth) acrylate; m is from 1 to 5; each R' is independently selected from hydrogen and the alkyl; n is from 1 to 5; and A is $SO_3^-$.

19. The fuel cell of claim 18, wherein the zwitterionic monomer is [2-(Methacryloyloxy) ethyl]dimethyl-(3-sulfopropyl)ammonium hydroxide and the (meth) acrylate crosslinker is hydroxyethyl methacrylate.

20. The fuel cell of claim 1, wherein the fuel cell is configured as a direct methanol fuel cell.

21. The fuel cell of claim 1, wherein the zwitterionic monomer has Formula I; further wherein the reactants consist of the zwitterionic monomer, the crosslinker, optionally, a second crosslinker, and optionally, an initiator; and further wherein the fuel cell further comprises a polymer electrolyte membrane between the anode and the cathode, wherein the zwitterionic polymer is in contact with the polymer electrolyte membrane without being covalently bound to the polymer electrolyte membrane.

22. The fuel cell of claim 21, wherein the zwitterionic monomer is [2-(Methacryloyloxy)ethyl]dimethyl-(3-sulfopropyl)ammonium hydroxide, the crosslinker is hydroxyethyl methacrylate, and the second crosslinker is N,N'-methylenebismethacrylamide.

* * * * *

UNITED STATES PATENT AND TRADEMARK OFFICE
CERTIFICATE OF CORRECTION

PATENT NO. : 12,338,397 B2
APPLICATION NO. : 17/722825
DATED : June 24, 2025
INVENTOR(S) : Gibum Kwon et al.

Page 1 of 1

It is certified that error appears in the above-identified patent and that said Letters Patent is hereby corrected as shown below:

In the Specification

Column 11, Line 35:
Delete the phrase "Amz" and replace with --$\Delta m_z$--.

In the Claims

Claim 3, Column 17, Line 60:
Delete the phrase "$SO_3^{31}$." and replace with --$SO_3^-$.--.

Signed and Sealed this
Second Day of September, 2025

Coke Morgan Stewart
*Acting Director of the United States Patent and Trademark Office*